(12) United States Patent
Matsui et al.

(10) Patent No.: US 11,794,147 B2
(45) Date of Patent: Oct. 24, 2023

(54) WASTEWATER TREATMENT METHOD AND WASTEWATER TREATMENT APPARATUS

(71) Applicants: Yokogawa Electric Corporation, Tokyo (JP); De Nora Permelec Ltd, Kanagawa (JP)

(72) Inventors: Yasuhiro Matsui, Musashino (JP); Hideki Komatsu, Musashino (JP); Yasuhito Ishii, Musashino (JP); Manabu Ozawa, Tamano (JP); Yoshinori Nishiki, Fujisawa (JP); Masaaki Kato, Tamano (JP); Rie Morita, Tamano (JP)

(73) Assignees: Yokogawa Electric Corporation, Tokyo (JP); De Nora Permelec Ltd, Kanagawa (JP)

( * ) Notice: Subject to any disclaimer, the term of this patent is extended or adjusted under 35 U.S.C. 154(b) by 23 days.

(21) Appl. No.: 17/639,768

(22) PCT Filed: Sep. 2, 2020

(86) PCT No.: PCT/JP2020/033272
§ 371 (c)(1),
(2) Date: Mar. 2, 2022

(87) PCT Pub. No.: WO2021/045107
PCT Pub. Date: Mar. 11, 2021

(65) Prior Publication Data
US 2023/0241555 A1 Aug. 3, 2023

(30) Foreign Application Priority Data
Sep. 5, 2019 (JP) ................................ 2019-162106

(51) Int. Cl.
*B01D 61/02* (2006.01)
*B01D 61/42* (2006.01)
*B01D 61/58* (2006.01)

(52) U.S. Cl.
CPC ........... *B01D 61/58* (2013.01); *B01D 61/025* (2013.01); *B01D 61/42* (2013.01);
(Continued)

(58) Field of Classification Search
CPC ...... B01D 61/024; B01D 61/42; B01D 61/58; B01D 2311/268
See application file for complete search history.

(56) References Cited

U.S. PATENT DOCUMENTS 5,240,579 A 8/1993 Kedem
5,578,181 A 11/1996 Hirose et al.
(Continued)

FOREIGN PATENT DOCUMENTS

JP H06269777 A 9/1994
JP H07171564 A 7/1995
(Continued)

*Primary Examiner* — Bradley R Spies
(74) *Attorney, Agent, or Firm* — Rankin, Hill & Clark LLP

(57) ABSTRACT

A wastewater treatment method includes: a soft water treatment 1 of crystallizing calcium carbonate from wastewater to remove the calcium carbonate therefrom; and an electrolysis 2 of electrolyzing some of the wastewater from which the calcium carbonate has been removed to obtain an acidic aqueous solution and an alkaline aqueous solution, wherein at least some of the alkaline aqueous solution is circulated to be used in the soft water treatment 1.

9 Claims, 11 Drawing Sheets

(52) U.S. Cl.
CPC .... *B01D 2311/25* (2013.01); *B01D 2311/268* (2013.01); *B01D 2311/2642* (2013.01)

(56) References Cited

U.S. PATENT DOCUMENTS

| | | |
|---|---|---|
| 2002/0079075 A1 | 6/2002 | Phipps |
| 2011/0056876 A1 | 3/2011 | Ide et al. |
| 2016/0264443 A1 | 9/2016 | Matsumoto et al. |

FOREIGN PATENT DOCUMENTS

| | | |
|---|---|---|
| JP | H081168 A | 1/1996 |
| JP | H09299953 A | 11/1997 |
| JP | 2011056345 A | 3/2011 |
| JP | 2014014738 A | 1/2014 |
| JP | 2015-29932 A | 2/2015 |
| JP | 2015-29933 A | 2/2015 |
| WO | 2012/087537 A1 | 6/2012 |

WASTEWATER TREATMENT METHOD AND WASTEWATER TREATMENT APPARATUS

TECHNICAL FIELD

The present invention relates to a wastewater treatment method and a wastewater treatment apparatus.

Priority is claimed on Japanese Patent Application No. 2019-162106, filed Sep. 5, 2019, the content of which is incorporated herein by reference.

BACKGROUND ART

In a wastewater treatment process, it is essential to add various chemicals in order to treat the wastewater. For example, a crystallization device used for soft water treatment needs to use chemicals (for example, an alkaline aqueous solution and the like) for a crystallization reaction.

Further, depending on a device, it is necessary to periodically clean the device in chemical and physical manners, and it is also necessary to use various chemicals at that time. For example, in treatment using a chelate resin or an ion exchange resin, it is necessary to periodically remove the chelate resin or the ion exchange resin with chemicals to restore performance.

On the other hand, various chemicals to be used in the above wastewater treatment process need to be transported from the outside and stored, which is a heavy economic burden.

On the other hand, for example, in Patent Literature 1, organic wastewater containing salts and organic substances is subjected to first softening treatment, suspended substance removal treatment (also referred to as SS removal treatment), and salt removal treatment. Then, in Patent Literature 1, the obtained salt concentrated water is subjected to softening treatment again, and the obtained second softened water is electrolyzed to generate a sodium hypochlorite solution. That is, Patent Literature 1 discloses an organic wastewater treatment method.

Further, in Patent Literature 2, wastewater to be treated is supplied to a diluent chamber of a pre-electrodialysis tank. Further, in Patent Literature 2, a concentrated liquid containing a salt generated by neutralizing ions that have passed through an ion exchange membrane in the pre-electrodialysis tank is supplied to an electrolytic dialysis tank in which three chambers, an anode chamber, a central chamber, and a cathode chamber, are configured as a unit with a cation exchange membrane and an anion exchange membrane as a diaphragm and is decomposed into acids and bases constituting the salt to be recovered. That is, Patent Literature 2 discloses a treatment method of wastewater containing a neutral salt of monovalent ions.

CITATION LIST

Patent Literature

[Patent Literature 1]
Japanese Unexamined Patent Application, First Publication No. 2014-14738
[Patent Literature 2]
Japanese Unexamined Patent Application, First Publication No. H08-001168

SUMMARY OF INVENTION

Technical Problem

Incidentally, in the wastewater treatment method, if various chemicals to be used in the wastewater treatment process can be produced and used on-site, it is not necessary to transport the chemicals from the outside and store them, and thus the economic burden can be significantly reduced.

Some aspects of the present invention have been made in view of the above circumstances, and an object of the present invention is to provide a wastewater treatment apparatus and a wastewater treatment method in which various chemicals to be used in the wastewater treatment process can be produced and used on-site and the economic burden can be significantly reduced.

Solution to Problem

To solve the above-described problem, some aspects of the present invention, the following configurations have been adopted.

(1) That is, a first aspect of the present invention is a wastewater treatment method including: a soft water treatment of crystallizing calcium carbonate from wastewater to remove the calcium carbonate therefrom; and an electrolysis of electrolyzing some of the wastewater from which the calcium carbonate has been removed to obtain an acidic aqueous solution and an alkaline aqueous solution, wherein at least some of the alkaline aqueous solution is circulated to be used in the soft water treatment.

(2) In the wastewater treatment method according to the first aspect of the present invention, at least some of the acidic aqueous solution may be circulated to be used in the electrolysis.

(3) In the wastewater treatment method according to the first aspect of the present invention, the wastewater treatment method may further include an electrodialysis of separating some of the wastewater from which the calcium carbonate has been removed into electrodialysis concentrated water and electrodialysis diluted water by electrodialysis treatment after the soft water treatment and before the electrolysis.

(4) In the wastewater treatment method according to the first aspect of the present invention, the wastewater treatment method may further include a reverse osmosis membrane treatment of separating some of the wastewater from which the calcium carbonate has been removed into reverse osmosis membrane treated water and reverse osmosis membrane concentrated water using a reverse osmosis membrane.

(5) In the wastewater treatment method according to the first aspect of the present invention, the wastewater treatment method may further include mixing the acidic aqueous solution with the wastewater from which the calcium carbonate has been removed before the reverse osmosis membrane treatment.

(6) In the wastewater treatment method according to the first aspect of the present invention, the wastewater treatment method may further include a sodium hypochlorite production of electrolyzing some of the wastewater from which the calcium carbonate has been removed to produce a sodium hypochlorite aqueous solution.

(7) In the wastewater treatment method according to the first aspect of the present invention, the electrolysis may be performed by a hydrogen oxidation reaction.

(8) In the wastewater treatment method according to the first aspect of the present invention, the wastewater may contain at least chloride ions, alkali metal ions, carbonate ions, and calcium ions.

(9) In the wastewater treatment method according to the first aspect of the present invention, a concentration of the chloride ions in the wastewater may be 0.01 mg/L or more.

(10) In the wastewater treatment method according to the first aspect of the present invention, a concentration of the alkali metal ions in the wastewater may be 0.01 mg/L or more.

(11) In the wastewater treatment method according to the first aspect of the present invention, the wastewater treatment method may further include: a pH adjustment of adjusting a pH of the wastewater to 10 or more.

(12) In the wastewater treatment method according to the first aspect of the present invention, in the soft water treatment, treatment may be performed such that a concentration of total calcium contained in the wastewater is 500 mg/L or less.

(13) In the wastewater treatment method according to the first aspect of the present invention, the acidic aqueous solution obtained in the electrolysis may be used for cleaning an electrolysis device that performs the electrolysis.

(14) A second aspect of the present invention is a wastewater treatment apparatus including: a crystallization device that crystallizes calcium carbonate from wastewater to remove the calcium carbonate therefrom; an electrolysis device that electrolyzes some of the wastewater from which the calcium carbonate has been removed to produce an acidic aqueous solution and an alkaline aqueous solution; and a first circulator that circulates at least some of the alkaline aqueous solution to the crystallization device.

(15) In the wastewater treatment apparatus according to the second aspect of the present invention, the wastewater treatment apparatus may further include a second circulator that circulates at least some of the acidic aqueous solution to the electrolysis device.

(16) In the wastewater treatment apparatus according to the second aspect of the present invention, the wastewater treatment apparatus may further include an electrodialysis device that separates some of the wastewater from which the calcium carbonate has been removed into electrodialysis concentrated water and electrodialysis diluted water by electrodialysis treatment between the crystallization device and the electrolysis device.

(17) In the wastewater treatment apparatus according to the second aspect of the present invention, the wastewater treatment apparatus may further include a reverse osmosis membrane treatment device that separates some of the wastewater from which the calcium carbonate has been removed into reverse osmosis membrane treated water and reverse osmosis membrane concentrated water using a reverse osmosis membrane.

(18) In the wastewater treatment apparatus according to the second aspect of the present invention, the wastewater treatment apparatus may further include a mixing portion that mixes the acidic aqueous solution with the wastewater from which the calcium carbonate has been removed.

(19) In the wastewater treatment apparatus according to the second aspect of the present invention, the wastewater treatment apparatus may further include a sodium hypochlorite production device that electrolyzes some of the wastewater from which the calcium carbonate has been removed to produce a sodium hypochlorite aqueous solution.

(20) In the wastewater treatment apparatus according to the second aspect of the present invention, the electrolysis device may have an anode which is a hydrogen gas diffusion electrode.

Advantageous Effects of Invention

According to the wastewater treatment method and the wastewater treatment apparatus of the aspects of the present invention, various chemicals used in the wastewater treatment process can be produced and used on-site, and the economic burden can be significantly reduced.

DESCRIPTION OF EMBODIMENTS

Figure 1:
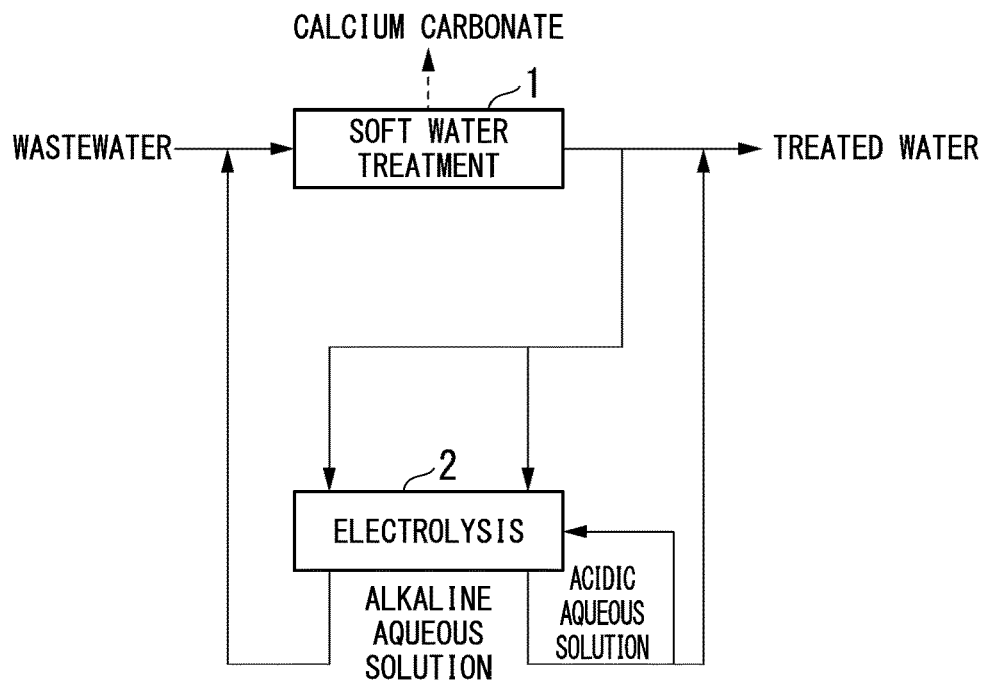
FIG. 1 is a schematic diagram of a wastewater treatment method of a first embodiment.

In recent years, with the increase in population and the improvement of living standards, the amount of clean water used has increased and water resources are in short supply. In addition, the deterioration of water quality in rivers and wastewater is progressing, and countermeasures are urgently needed all over the world.

For example, a project to use reclaimed water is being considered for the purpose of sustainable use of water resources.

Wastewater treatment is generally divided into primary treatment, secondary treatment, and tertiary treatment.

In the primary treatment, large dust (SS: suspended substance) is removed. Specifically, an SS is a solid substance in sewage mixed with excreta.

In the secondary treatment, an organic substance in the sewage that could not be removed in the primary treatment is removed by the action of microorganisms. Specifically, in the secondary treatment, simple aeration treatment, activated sludge treatment, methane fermentation treatment, and the like are performed.

In the tertiary treatment (also referred to as advanced treatment or post-treatment), nitrogen, phosphorus, a decomposing persistent substance, and the like are removed by chemical, physical, and biological methods.

Examples of the chemical treatment include separation of pollutants using a flocculant and the like, decomposition of pollutants with an oxidizing agent such as ozone, and the like.

Physical treatment includes activated carbon adsorption and separation by membrane treatment.

As a membrane used for separation by the membrane treatment, a reverse osmosis membrane (or an RO membrane), an ultrafiltration membrane (or a UF membrane), a microfiltration membrane (or an MF membrane), and the like are used. Among them, the membrane treatment using the reverse osmosis membrane is attracting attention because it can directly remove impurities other than water such as ions and salts.

In the above wastewater treatment process, it is essential to add various chemicals in order to treat the wastewater. For example, a crystallization device needs to use chemicals (for example, an alkaline aqueous solution and the like) for a crystallization reaction.

Further, depending on a device, it is necessary to periodically clean the device in chemical and physical manners, and it is also necessary to use various chemicals at that time. For example, in treatment using a chelate resin or an ion exchange resin, it is necessary to periodically remove the chelate resin or the ion exchange resin with chemicals to restore performance.

On the other hand, various chemicals to be used in the above wastewater treatment process need to be transported from the outside and stored, which is a heavy economic burden.

The treatment methods of the related art described in Patent Literature 1 and Patent Literature 2 described above can solve the problem of transporting the chemicals from the outside, but do not solve the problem of having to store the produced chemicals. In addition, the treatment method described in Patent Literature 2 has a problem that the separation characteristics of calcium are not sufficient. Therefore, in the treatment methods of the related art, the various chemicals to be used in the wastewater treatment process could not be produced and used on-site.

A wastewater treatment method of a first embodiment includes: a soft water treatment of crystallizing calcium carbonate from wastewater containing at least chloride ions, alkali metal ions, carbonate ions, and calcium ions (hereinafter simply referred to as wastewater) to remove the calcium carbonate therefrom; and an electrolysis of electrolyzing some of the wastewater from which the calcium carbonate has been removed to obtain an acidic aqueous solution and an alkaline aqueous solution, wherein at least some of the alkaline aqueous solution is circulated to be used in the soft water treatment. As a result, a complete type in which various chemicals to be used in the wastewater treatment process are produced and consumed on-site (that is, zero chemical charge (ZCC): no chemical input) can be achieved, and the economic burden can be significantly reduced.

<Wastewater Treatment Method of First Embodiment>

A wastewater treatment method of a first embodiment is a wastewater treatment method of treating wastewater containing at least chloride ions, alkali metal ions, carbonate ions, and calcium ions, the method including: a soft water treatment 1 of crystallizing calcium carbonate from the wastewater to remove the calcium carbonate therefrom; and an electrolysis 2 of electrolyzing some of the wastewater from which the calcium carbonate has been removed to obtain an acidic aqueous solution and an alkaline aqueous solution, wherein at least some of the alkaline aqueous solution is circulated to be used in the soft water treatment 1.

A schematic diagram of the wastewater treatment method of the first embodiment is as shown in FIG. 1.

Wastewater

Examples of the wastewater (also referred to as water to be treated) in the wastewater treatment method of the first embodiment include organic wastewater that contains at least chloride ions, alkali metal ions, carbonate ions, and calcium ions and that cannot be reused or discharged into rivers or the like. Specifically, examples of the wastewater include organic wastewater having a high salt concentration such as seawater, excreta, and leachate from landfills of garbage, and the like. These generally contain impurities (hereinafter also referred to as various ionic components) such as calcium ions, magnesium ions, sodium ions, silica (for example, ionic silica and colloidal silica), chloride ions, and carbonate ions.

From the viewpoint of further exhibiting the effect of the first embodiment, a lower limit of a concentration of the chloride ions in the wastewater is preferably 0.01 mg/L or more. On the other hand, an upper limit of a concentration of the chloride ions in the wastewater is not particularly limited and is, for example, 500 mg/L or less.

Further, a lower limit of a concentration of the alkali metal ions in the wastewater is preferably 0.01 mg/L or more. On the other hand, an upper limit of a concentration of the alkali metal ions in the wastewater is not particularly limited and is, for example, 500 mg/L or less.

In the present description, a concentration of cations is a value measured by an inductively coupled plasma (ICP) emission spectroscopic analysis method. Specifically, a concentration of cations is a value measured using an emission spectroscopic analysis device (ICP-AES; SPS5520, manufactured by Seiko Instruments Inc.) with ICP of argon gas as a light source.

On the other hand, a concentration of anions is a value measured using an ion chromatograph analysis device (ICA-2000; manufactured by DKK-TOA CORPORATION).

Figure 2:
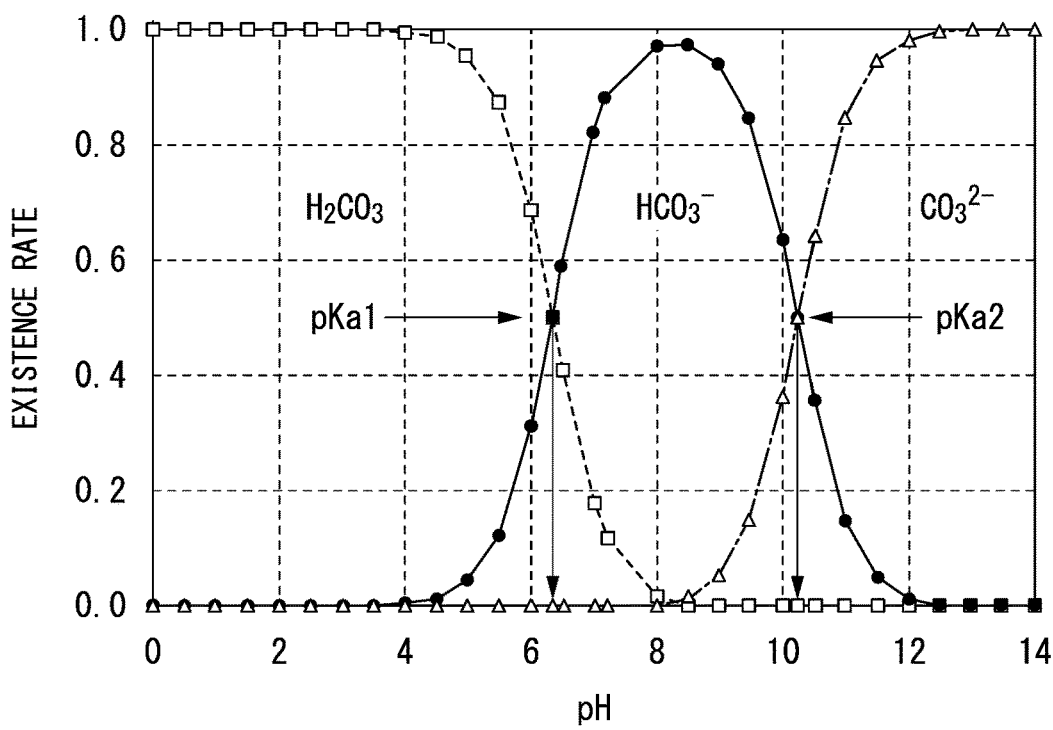
FIG. 2 is a diagram showing a relationship between a pH and morphology of carbonate ions.

As shown in FIG. 2, a molecular formula and an ionic formula of carbonate ions (also referred to as a carbonate substance) change depending on a pH. In the present description, carbonate ions (also referred to as a carbonate substance) include all of $H_2CO_3$, $HCO_3^-$, and $CO_3^{2-}$. That is, the carbonate ions in the present description are $H_2CO_3$ in a case where the wastewater is acidic (for example, the pH is less than 6). The carbonate ions are $HCO_3^-$ in a case where the wastewater is neutral (for example, the pH is about 6 to 10). The carbonate ions are $CO_3^{2-}$ in a case where the wastewater is alkaline (for example, the pH is about 10 or more).

[Soft Water Treatment]

The soft water treatment 1 crystallizes calcium carbonate from the wastewater to remove the calcium carbonate therefrom.

It is possible to remove the calcium ions from the above wastewater by allowing carbonate ions to act on calcium ions and precipitating them as calcium carbonate having low solubility.

Examples of a method for crystallizing calcium carbonate from wastewater include, for example, a lime soda method.

The lime soda method is a method in which the pH of the wastewater is adjusted such that the wastewater is in an alkaline region, and then sodium carbonate is added to the wastewater to deposit and remove the calcium ions contained in the wastewater as calcium carbonate.

In the above method, from the viewpoint of making it easier to remove the calcium carbonate, the pH of the wastewater is preferably adjusted to 10 or more and more preferably adjusted to 10.3 or more.

As shown in FIG. 1, in the wastewater treatment method according to the first embodiment, the pH of the wastewater can be adjusted using an alkaline aqueous solution obtained in an electrolysis 2 which will be described later.

In the present description, the pH of each of various aqueous solutions is a value obtained by measuring the pH of each of various aqueous solutions at 25° C. with a pH meter (D74, manufactured by HORIBA, Ltd.).

In the soft water treatment 1, it is preferable to perform treatment such that a T-Ca concentration in the wastewater is 500 mg/L or less, and it is more preferable to perform treatment such that the T-Ca concentration in the wastewater is 200 mg/L or less.

Here, the "T-Ca concentration" is the total calcium concentration in the wastewater, and the calcium includes not only ions but also dissolved and undissociated calcium salts.

By setting the T-Ca concentration in the wastewater to the above-mentioned preferable range or less, it is possible to further prevent hard components precipitating and clogging or the like in an electrolysis device in the electrolysis 2 which will be described later.

The wastewater treatment method of the first embodiment has the soft water treatment 1 and thus can reduce the calcium ions contained in the wastewater.

[Electrolysis]

The electrolysis 2 electrolyzes some of the wastewater from which the calcium carbonate has been removed to obtain an acidic aqueous solution and an alkaline aqueous solution.

Specifically, in the electrolysis 2, a voltage is applied to a pair of electrodes having electron conductivity (that is, a positive electrode; an anode, a negative electrode; a cathode) and an electrolyte having ionic conductivity, and thus an oxidation reaction occurs at an anode and a reduction reaction occurs at a cathode to obtain the acidic aqueous solution and the alkaline aqueous solution.

The electrolysis 2 can be performed, for example, using a two-chamber electrolysis device (see FIG. 7) or a three-chamber electrolysis device (see FIG. 8), which will be described later.

In the electrolysis 2, for example, when the wastewater containing sodium ions and chloride ions is electrolyzed, a reaction represented by the following formula (1) proceeds, and a sodium hydroxide aqueous solution (that is, the alkaline aqueous solution) and hydrochloric acid (that is, the acidic aqueous solution) are obtained.

$$NaCl + 2H_2O = NaOH + HCl + H_2 + \tfrac{1}{2}O_2 \qquad (1)$$

For example, in a two-chamber electrolysis device (see FIG. 7) which will be described later, a mixture of hydrochloric acid and salt water can be obtained as the acidic aqueous solution, and a mixture of sodium hydroxide and salt water can be obtained as the alkaline aqueous solution.

On the other hand, in a three-chamber electrolysis device which will be described later (see FIG. 8), a sodium hydroxide aqueous solution is obtained in a cathode chamber, and hydrochloric acid is obtained in an anode chamber.

The sodium hydroxide obtained by this reaction is used in the soft water treatment 1 described above.

Further, in a case where an electrolysis device whose anode is a hydrogen gas diffusion electrode is used, a hydrogen oxidation reaction represented by the following formula (2) occurs at the anode. Further, the total reaction is as shown in the following formula (3).

$$H_2 = 2H^+ + 2e^- \qquad (2)$$

$$NaCl + H_2O = NaOH + HCl \qquad (3)$$

As raw material hydrogen gas, high-purity electrolytic hydrogen gas generated at the cathode is used. Chlorine generation can be suppressed by keeping a potential lower than a chlorine generation potential.

In the electrolysis 2, the generation of chlorine can be further suppressed by producing the acidic aqueous solution and the alkaline aqueous solution by the hydrogen oxidation reaction described above.

The acidic aqueous solution obtained by the above reaction may be used for cleaning the inside of the electrolysis device used in the electrolysis 2. Due to a continuous operation of the electrolysis device for a long period of time, the hard components are precipitated at a diaphragm and the cathode in the electrolysis device, which causes the performance of the electrolysis device to deteriorate. Therefore, it is preferable to intermittently stop the electrolysis device and to clean the electrolysis device with the acidic aqueous solution obtained in the electrolysis 2. The frequency of cleaning depends on the water quality and operating conditions, but it is preferable to perform the cleaning every several hours to several tens of hours and to perform the cleaning for several tens of minutes to several hours.

The cleaning is a necessary for continuously obtaining the acidic aqueous solution and the alkaline aqueous solution in the electrolysis 2. Therefore, the cleaning is included in the electrolysis 2 even though it is performed when the electrolysis device used in the electrolysis 2 is stopped. That is, in the present description, even in a case where the acidic aqueous solution is used for cleaning the inside of the electrolysis device used in the electrolysis 2, it is expressed that the acidic aqueous solution is used in the electrolysis 2.

Further, the acidic aqueous solution obtained by the above reaction may be used to neutralize the alkaline-adjusted wastewater in the soft water treatment 1.

Neutralizing the alkaline-adjusted wastewater in the soft water treatment 1 adjusts the pH of the wastewater to be used in the subsequent electrolysis 2. Therefore, the neutralizing the alkaline-adjusted wastewater is also included in the electrolysis 2. That is, in the present description, even in a case where the acidic aqueous solution is used for adjusting the pH of the wastewater to be supplied to the electrolysis device used in the electrolysis 2, it is expressed that the acidic aqueous solution is used in the electrolysis 2.

In the schematic diagram of the wastewater treatment method of the first embodiment shown in FIG. 1, a flow in which the acidic aqueous solution obtained in the electrolysis 2 is used for cleaning the electrolysis device and adjusting the pH of the wastewater from which the calcium carbonate has been removed is shown. However, the utilizing the acidic aqueous solution is optional, and this may not be included in the wastewater treatment method of the first embodiment.

[Other Options]

The wastewater treatment method of the first embodiment may have other options. Examples of the options include an electrodialysis of separating some of the wastewater from which the calcium carbonate has been removed into electrodialysis concentrated water and electrodialysis diluted water by electrodialysis treatment; a reverse osmosis membrane treatment of separating some of the wastewater from which the calcium carbonate has been removed into reverse osmosis membrane treated water and reverse osmosis membrane concentrated water using a reverse osmosis membrane; and a sodium hypochlorite production of electrolyzing some of the wastewater from which the calcium carbonate has been removed to produce a sodium hypochlorite aqueous solution.

Further, in a case where the reverse osmosis membrane treatment is performed, mixing the acidic aqueous solution obtained in the electrolysis 2 with the wastewater from which the calcium carbonate has been removed may be provided before the reverse osmosis membrane treatment.

The reverse osmosis membrane treatment may be performed before the soft water treatment 1, may be performed after the soft water treatment 1, or may be performed both before and after the soft water treatment 1.

Details of each option will be described later.

The wastewater treatment method of the first embodiment described above includes the soft water treatment 1 and the electrolysis 2 described above, and at least some of the alkaline aqueous solution obtained in the electrolysis 2 is circulated to be used in the soft water treatment 1. The alkaline aqueous solution necessary for efficiently crystallizing the calcium carbonate from the wastewater in the soft water treatment 1 can be produced on-site in the electrolysis 2. The alkaline aqueous solution produced on-site in the electrolysis 2 can be used in the soft water treatment 1. Therefore, it is not necessary to transport the chemicals from the outside and store them, and thus the economic burden can be significantly reduced.

<Wastewater Treatment Method of Second Embodiment>

A wastewater treatment method of a second embodiment is a wastewater treatment method of treating wastewater containing at least chloride ions, alkali metal ions, carbonate ions, and calcium ions, the method including: a soft water treatment 1 of crystallizing calcium carbonate from the wastewater to remove the calcium carbonate therefrom; an electrodialysis 3 of separating some of the wastewater from which the calcium carbonate has been removed into electrodialysis concentrated water and electrodialysis diluted water by electrodialysis treatment; an electrolysis 2 of electrolyzing some of the electrodialysis concentrated water to obtain an acidic aqueous solution and an alkaline aqueous solution; and a reverse osmosis membrane treatment 4 of separating some of the wastewater from which the calcium carbonate has been removed into reverse osmosis membrane treated water and reverse osmosis membrane concentrated water using a reverse osmosis membrane. Then, at least some of the alkaline aqueous solution is circulated to be used in the soft water treatment 1. Further, at least some of the acidic aqueous solution is circulated to be used in the electrolysis 2.

Figure 3:
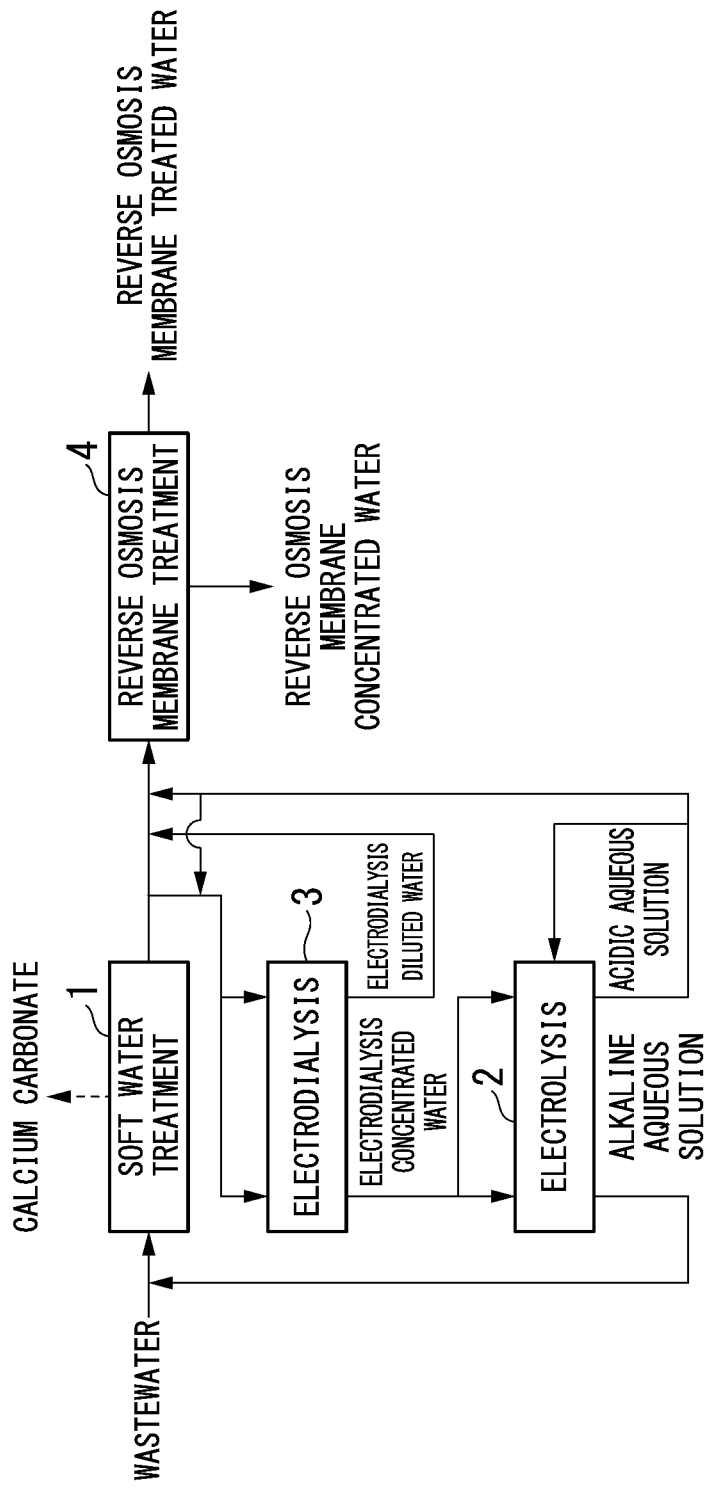
FIG. 3 is a schematic diagram of a wastewater treatment method of a second embodiment.

A schematic diagram of the wastewater treatment method of the second embodiment is as shown in FIG. 3.

[Soft Water Treatment]

The soft water treatment 1 is the same as that of the wastewater treatment method of the first embodiment described above.

[Electrodialysis]

The electrodialysis 3 separates some of the wastewater from which the calcium carbonate has been removed into electrodialysis concentrated water and electrodialysis diluted water by electrodialysis treatment.

Specifically, a large number of electrodialysis membranes are arranged, the wastewater from which the calcium carbonate has been removed is supplied to an electrodialysis device having a concentration chamber and a dilution chamber which are alternately formed, and the electrodialysis device is energized. As a result, electrodialysis concentrated water containing various ionic components in a high concentration can be obtained in the concentration chamber, and electrodialysis diluted water containing various ionic components in a low concentration can be obtained in the dilution chamber.

In addition, in order to obtain the electrodialysis concentrated water, instead of the wastewater or in addition to the wastewater, dialysis water having a small amount of multivalent ions (for example, tap water or the like) may be supplied to the concentration chamber of the electrodialysis device used in the electrodialysis 3.

By supplying the dialysis water having a small amount of multivalent ions to the concentration chamber of the electrodialysis device used in the electrodialysis 3, it is possible to improve the production efficiency of the acidic aqueous solution and the alkaline aqueous solution in an electrolysis device which will be described later.

The electrodialysis device used in the wastewater treatment method of the second embodiment alternately includes, for example, a monovalent anion selective permeable ion exchange membrane that fixes positive charges in the membrane and a monovalent cation selective permeable ion exchange membrane that fixes negative charges in the membrane. Therefore, in the concentration chamber, the electrodialysis concentrated water containing the alkali metal ions and the like (for example, monovalent cations) and the chloride ions and the like (for example, monovalent anions) in a high concentration can be obtained. In the dilution chamber, the electrodialysis diluted water containing the alkali metal ions and the like (for example, monovalent cations) and the chloride ions and the like (for example, monovalent anions) in a low concentration can be obtained. The multivalent ions generally contained in the wastewater (for example, magnesium ions, sulfate ions, and the like) cannot pass through the monovalent cation selective permeable ion exchange membrane and the monovalent anion selective permeable ion exchange membrane. Therefore, in the electrodialysis concentrated water, the multivalent ions can be removed.

Before the electrodialysis 3 in the second embodiment, adjusting the pH of the wastewater to be supplied to the electrodialysis device, that is, the wastewater from which the calcium carbonate has been removed in the soft water treatment 1 may be provided. When adjusting the pH, it is preferable to adjust the pH of the wastewater by mixing the acidic aqueous solution obtained in the electrolysis 2 which will be described later with the wastewater. The pH of the wastewater is preferably adjusted to 10 or less and is more preferably adjusted to 3 to 9.

As a result, it is possible to further prevent deterioration of the monovalent anion selective permeable ion exchange membrane and the monovalent cation selective permeable ion exchange membrane of the electrodialysis device used in the electrodialysis 3.

The wastewater treatment method of the second embodiment has the electrodialysis 3, and thus it is possible to increase the concentration of the monovalent cations (that is, the alkali metal ions) in the wastewater (that is, the wastewater from which the calcium carbonate has been removed). Therefore, in the electrolysis 2 which will be described later, the alkaline aqueous solution can be generated more efficiently. In addition, multivalent ions that tend to adhere to the electrolysis device used in the electrolysis 2 can be removed in advance.

[Electrolysis]

The electrolysis 2 electrolyzes some of the electrodialysis concentrated water to obtain an acidic aqueous solution and an alkaline aqueous solution. A specific method is the same as the wastewater treatment method of the first embodiment described above, but in the second embodiment, the electrodialysis 3 is provided before the electrolysis 2, and thus the concentration of alkali metal ions (that is, the monovalent cations) in the wastewater can be increased, and the alkaline aqueous solution can be more efficiently obtained.

When the electrodialysis concentrated water obtained in the electrodialysis 3 described above is supplied to the electrolysis device, as for the supply amount to the cathode chamber of the electrolysis device (that is, the chamber for synthesizing the alkaline aqueous solution by electrolysis) and the anode chamber of the electrolysis device (that is, the chamber for synthesizing the acidic aqueous solution by electrolysis), it is preferable to make the supply amount to the anode chamber of the electrolysis device larger.

Specifically, the ratio between the supply amounts of the electrodialysis concentrated water to the cathode chamber and the anode chamber of the electrolysis device (that is, the cathode chamber supply amount: the anode chamber supply amount) is preferably 1:1.2 to 1:3 and more preferably 1:1.5 to 1:2.5.

By making the supply amount of the electrodialysis concentrated water to the anode chamber of the electrolysis device larger than that to the cathode chamber of the electrolysis device, the ratio of hydrogen ions generated in the electrolysis 2 to sodium ions (that is, $H^+/Na^+$) can be reduced. As a result, it is possible to suppress the movement of the hydrogen ions to the cathode chamber due to a decrease in pH in the anode chamber of the electrolysis device (that is, the movement due to concentration polarization and electrophoresis).

[Reverse Osmosis Membrane Treatment]

The reverse osmosis membrane treatment 4 separates some of the wastewater from which the calcium carbonate has been removed into reverse osmosis membrane treated water and reverse osmosis membrane concentrated water using a reverse osmosis membrane.

Here, the reverse osmosis membrane (that is, an RO membrane) is a membrane having a property of allowing water to pass therethrough and not allowing impurities other than water such as ions and salts to pass therethrough.

In the reverse osmosis membrane treatment 4, supply water having an increased pressure is concentrated using the reverse osmosis membrane and is separated into the reverse osmosis membrane treated water from which impurities other than water such as ions and salts have been removed and the reverse osmosis membrane concentrated water in which impurities other than water such as ions and salts are concentrated. Generally, the reverse osmosis membrane concentrated water is discarded.

Generally, in the reverse osmosis membrane treatment in a reclaimed water process, 75% to 85% of the supply water is recovered as the reverse osmosis membrane treated water, and 15% to 25% is discharged as the reverse osmosis membrane concentrated water. The total evaporation residue (that is, TDS: total dissolved solids) such as salts in the supply water is drained from the reverse osmosis membrane concentrated water.

Here, the total evaporation residue (that is, TDS) is a substance that is suspended or dissolved in water and is contained therein and is the total amount of the substance that remains when the water is evaporated.

In the reverse osmosis membrane treatment 4 of the second embodiment, a reverse osmosis membrane having any other operating pressure can be used depending on the water quality of the supply water.

For example, in a case where the content of the total evaporation residue (that is, TDS) in the supply water is more than 10,000 mg/L, a high pressure reverse osmosis membrane is used. In a case where the content of the total evaporation residue (that is, TDS) in the supply water is more than 1,000 mg/L and 10,000 mg/L or less, a medium pressure reverse osmosis membrane is used. In a case where the content of the total evaporation residue (that is, TDS) in the supply water is 1,000 mg/L or less, a low pressure reverse osmosis membrane is used.

In the reverse osmosis membrane treatment of the second embodiment, higher pressure osmosis membrane treated water can be recovered using a high pressure reverse osmosis membrane having a pressure resistance specification of 5.5 MPa (that is, 800 psi) in combination.

The wastewater treatment method of the second embodiment has the reverse osmosis membrane treatment 4, and thus it is possible to remove impurities other than water such as ions and salts contained in the wastewater, and it is possible to obtain the treated water in which the content of the total evaporation residue (that is, TDS) is more reduced (that is, the reverse osmosis membrane treated water).

In the reverse osmosis membrane treatment 4 of the second embodiment, the reverse osmosis membrane may be cleaned using the acidic aqueous solution obtained in the electrolysis 2 described above.

Further, before the reverse osmosis membrane treatment 4 of the second embodiment, mixing the wastewater to be used in the reverse osmosis membrane treatment 4 of the second embodiment (that is, the wastewater from which the calcium carbonate has been removed and/or the electrodialysis diluted water) with the acidic aqueous solution obtained in the electrolysis 2 described above may be provided.

For example, in a case where the calcium carbonate remains in the treated water of the soft water treatment 1 and silica (for example, ionic silica or colloidal silica) is contained in the treated water, the treated water and the acidic aqueous solution are mixed with each other, and the pH of the wastewater is adjusted. As a result, it possible to prevent the precipitation of the calcium carbonate contained in the wastewater, to maintain the ionization of $SiO_2$, and to prevent the scale formation due to the deposition of $SiO_2$.

Specifically, in a case where the pH of the treated water obtained in the soft water treatment 1 is 9.5 or more and the $SiO_2$ concentration thereof is 80 mg/L or more, it is preferable to add the acidic aqueous solution such that the pH becomes about 9.5, and it is more preferable to add the acidic aqueous solution such that the pH of the wastewater is in the range of 8.5 to 9.5.

That is, in the wastewater treatment method of the second embodiment, in the soft water treatment 1, it is preferable to adjust the pH of the wastewater containing at least the chloride ions, the alkali metal ions, the carbonate ions, and the calcium ions to preferably 10 or more and more preferably 10.3 or more using the alkaline aqueous solution obtained in the electrolysis 2.

On the other hand, in the subsequent reverse osmosis membrane treatment 4, it is preferable to adjust the pH of the wastewater from which the calcium carbonate has been removed to preferably about 9.5 and more preferably 8.5 to 9.5 using the acidic aqueous solution obtained in the electrolysis 2.

In the schematic diagram of the wastewater treatment method of the second embodiment shown in FIG. 3, the acidic aqueous solution obtained in the electrolysis 2 is added to the wastewater to be supplied to the electrodialysis device before the electrodialysis 3. Further, before the reverse osmosis membrane treatment 4, the aqueous acidic solution is added to the wastewater to be supplied to the reverse osmosis membrane treatment device. However, these are options, and these may not be included in the wastewater treatment method of the second embodiment.

The wastewater treatment method of the second embodiment described above is a wastewater treatment method which includes the soft water treatment 1, the electrodialysis 3, the electrolysis 2, and the reverse osmosis membrane treatment 4 described above and in which at least some of the alkaline aqueous solution is circulated to be used in the soft water treatment 1 and at least some of the acidic aqueous solution is circulated to be used in the electrolysis 2.

The wastewater treatment method of the second embodiment further includes the electrodialysis 3 and the reverse osmosis membrane treatment 4 in addition to the wastewater treatment method of the first embodiment. Since the wastewater treatment method of the second embodiment includes the electrodialysis 3, it is possible to increase the concentration of the alkali metal ions in the wastewater, and it is possible to more efficiently obtain the alkaline aqueous solution in the subsequent electrolysis 2.

Further, the wastewater treatment method of the second embodiment includes the reverse osmosis membrane treatment 4. Therefore, it is possible to remove impurities other than water such as ions and salts contained in the wastewater, and it is possible to obtain the treated water in which the content of the total evaporation residue (that is, TDS) is more reduced (that is, the reverse osmosis membrane treated water).

Further, in a case where the wastewater treatment method of the second embodiment has mixing the wastewater to be used in the reverse osmosis membrane treatment 4 of the second embodiment (that is, the wastewater from which the calcium carbonate has been removed and/or the electrodialysis diluted water) with the acidic aqueous solution obtained in the electrolysis 2 described above before the reverse osmosis membrane treatment 4, it is possible to further improve the removability of $SiO_2$.

<Wastewater Treatment Method of Third Embodiment>

A wastewater treatment method of a third embodiment is a wastewater treatment method of treating wastewater containing at least chloride ions, alkali metal ions, carbonate ions, and calcium ions, the method including: a soft water treatment 1 of crystallizing calcium carbonate from the wastewater to remove the calcium carbonate therefrom; an electrodialysis 3 of separating some of the wastewater from which the calcium carbonate has been removed into electrodialysis concentrated water and electrodialysis diluted water by electrodialysis treatment; an electrolysis 2 of electrolyzing some of the electrodialysis concentrated water to obtain an acidic aqueous solution and an alkaline aqueous solution; a sodium hypochlorite production of electrolyzing some of the electrodialysis concentrated water to produce a sodium hypochlorite aqueous solution; and a reverse osmosis membrane treatment 4 of separating some of the wastewater from which the calcium carbonate has been removed into reverse osmosis membrane treated water and reverse osmosis membrane concentrated water using a reverse osmosis membrane. Then, at least some of the alkaline aqueous solution is circulated to be used in the soft water treatment 1, and at least some of the acidic aqueous solution is circulated to be used in the electrolysis 2.

Figure 4:
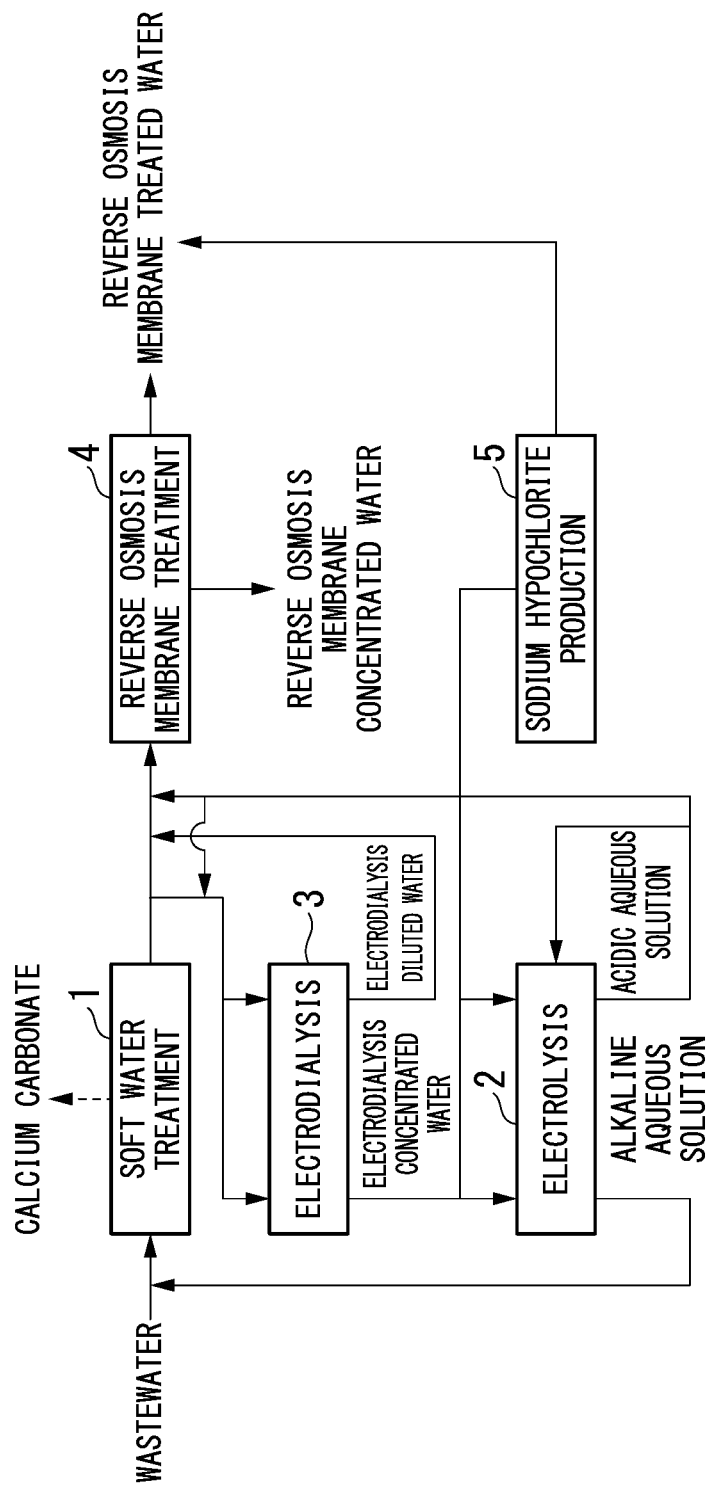
FIG. 4 is a schematic diagram of a wastewater treatment method of a third embodiment.
Figure 5:
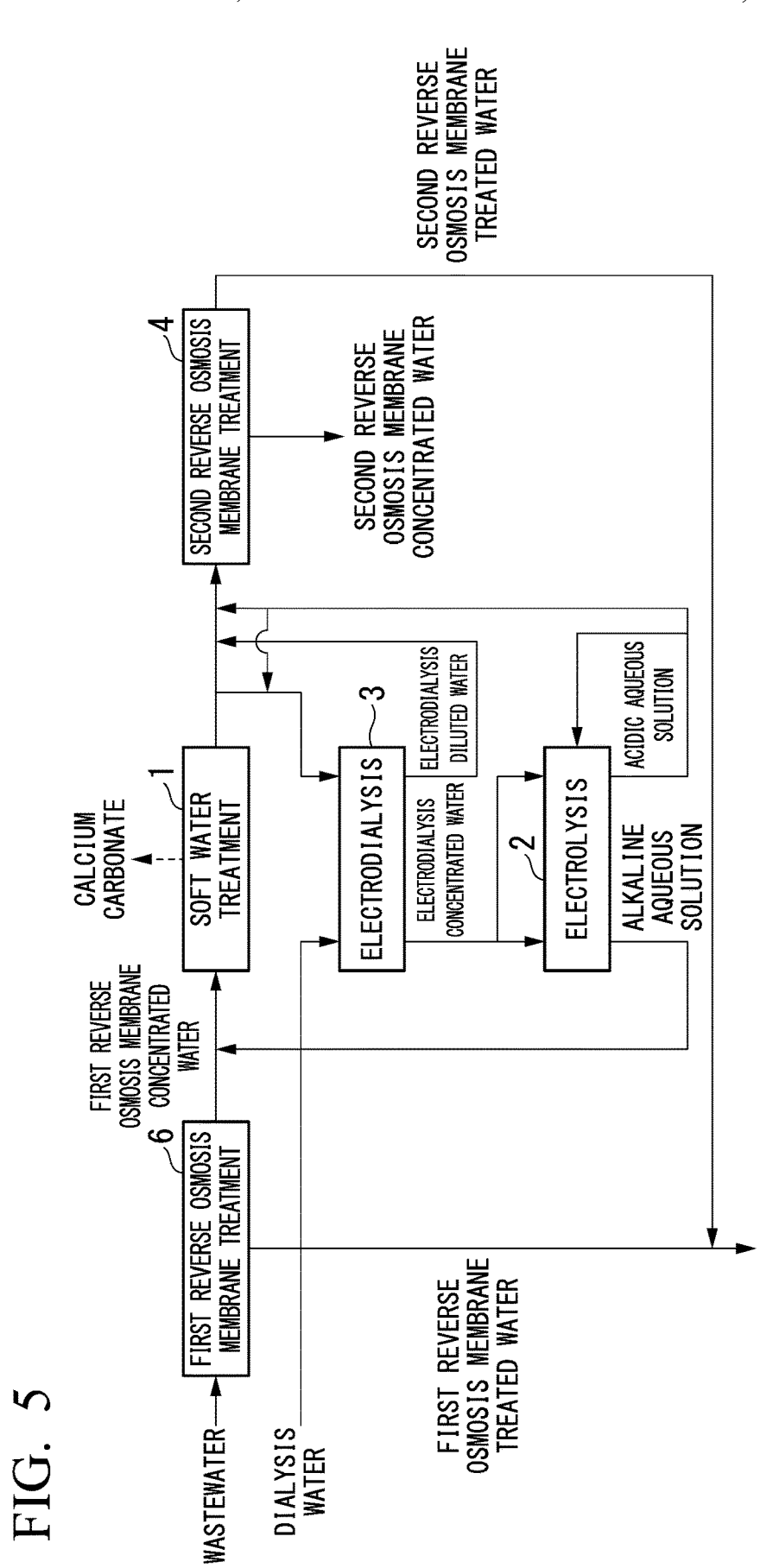
FIG. 5 is a schematic diagram of a wastewater treatment method of a fourth embodiment.

A schematic diagram of the wastewater treatment method of the third embodiment is as shown in FIG. 4.

The wastewater treatment method of the third embodiment further includes the sodium hypochlorite production in addition to the wastewater treatment method of the second embodiment described above.

[Sodium Hypochlorite Production]

The sodium hypochlorite production electrolyzes some of the electrodialysis concentrated water to produce a sodium hypochlorite aqueous solution.

By using the electrolysis device for producing the sodium hypochlorite aqueous solution and appropriately selecting an anode catalyst for the electrolysis device, a reaction as shown in the following formula (4) occurs, and the sodium hypochlorite can be produced from the chloride ions contained in the wastewater.

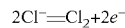

The sodium hypochlorite can be used as a disinfectant for the treated water (that is, the reverse osmosis membrane treated water).

Therefore, in addition to the effects of the wastewater treatment methods of the first and second embodiments described above, in the wastewater treatment method of the third embodiment, the sodium hypochlorite aqueous solution to be used as a disinfectant for the treated water (that is, the reverse osmosis membrane treated water) is produced on-site in the sodium hypochlorite production and is added to the treated water (that is, the reverse osmosis membrane treated water), and thus the sodium hypochlorite aqueous solution can be used as a disinfectant. A hypochlorous acid component stably exists as hypochlorous acid ions in an alkaline range and as hypochlorous acid in an acidic range, and any of them can be produced by changing the pH of the solution to be electrolyzed. It is known that the sterilizing power is higher in the latter. Sodium hypochlorite in the present description is a generic term for them.

<Wastewater Treatment Method of Fourth Embodiment>

A wastewater treatment method of a fourth embodiment further includes a reverse osmosis membrane treatment before the wastewater treatment method of the second embodiment described above.

For convenience, the reverse osmosis membrane treatment performed after the soft water treatment as described above is referred to as a second reverse osmosis membrane treatment, and the reverse osmosis membrane treatment performed before the soft water treatment is referred to as a first reverse osmosis membrane treatment.

That is, the wastewater treatment method of the fourth embodiment is a wastewater treatment method of treating wastewater containing at least chloride ions, alkali metal ions, carbonate ions, and calcium ions, the method including: a first reverse osmosis membrane treatment 6 of separating the wastewater into first reverse osmosis membrane treated water and first reverse osmosis membrane concentrated water using a first reverse osmosis membrane; a soft water treatment 1 of crystallizing calcium carbonate from the first reverse osmosis membrane concentrated water to remove the calcium carbonate therefrom; an electrodialysis 3 of separating some of the first reverse osmosis membrane concentrated water from which the calcium carbonate has been removed into electrodialysis concentrated water and electrodialysis diluted water by electrodialysis treatment; an electrolysis 2 of electrolyzing some of the electrodialysis concentrated water to obtain an acidic aqueous solution and an alkaline aqueous solution; and a second reverse osmosis membrane treatment 4 of separating some of the first reverse osmosis membrane concentrated water from which the calcium carbonate has been removed into second reverse osmosis membrane treated water and second reverse osmosis membrane concentrated water using a second reverse osmosis membrane. Then, at least some of the alkaline aqueous solution is circulated to be used in the soft water treatment 1, and at least some of the acidic aqueous solution is circulated to be used in the electrolysis 2.

The first reverse osmosis membrane treatment 6 and the second reverse osmosis membrane treatment 4 may be the same or different. That is, the reverse osmosis membrane treatment may be repeated using the same device, or different reverse osmosis membrane treatments may be performed by changing the type of the reverse osmosis membrane, for example. Examples of a case where the first reverse osmosis membrane treatment 6 and the second reverse osmosis membrane treatment 4 are different include, for example, a case where the second reverse osmosis membrane treatment 4 is performed using a reverse osmosis membrane having a higher pressure resistance.

According to the wastewater treatment method of the fourth embodiment, in the electrodialysis 3, dialysis water is used in addition to the first reverse osmosis membrane concentrated water in order to separate the first reverse osmosis membrane concentrated water into the electrodialysis concentrated water and the electrodialysis diluted water. Although it is not essential to use the dialysis water, by supplying the dialysis water having a small amount of multivalent ions to the concentration chamber of the electrodialysis device used in the electrodialysis 3, it is possible to improve the production efficiency of the acidic aqueous solution and the alkaline aqueous solution in the electrolysis which will be described later.

The wastewater treatment method of the fourth embodiment may also include a sodium hypochlorite production of electrolyzing some of the electrodialysis concentrated water described above to produce a sodium hypochlorite aqueous solution.

Further, the wastewater treatment method of the fourth embodiment includes the first reverse osmosis membrane treatment 6 and the second reverse osmosis membrane treatment 4. Therefore, in addition to the effect of the wastewater treatment method of the second embodiment, it is possible to more remove impurities other than water such as ions and salts contained in the wastewater, and it is possible to obtain the treated water in which the content of the total evaporation residue (that is, TDS) is further reduced (that is, the reverse osmosis membrane treated water). In addition, the recovery rate of the reverse osmosis membrane treated water can be further improved.

<Wastewater Treatment Apparatus of First Embodiment>

A wastewater treatment apparatus of a first embodiment is a wastewater treatment apparatus that treats wastewater containing at least chloride ions, alkali metal ions, carbonate ions, and calcium ions, the apparatus including: a crystallization device that crystallizes calcium carbonate from wastewater to remove the calcium carbonate therefrom; an electrolysis device that electrolyzes some of the wastewater from which the calcium carbonate has been removed to produce an acidic aqueous solution and an alkaline aqueous solution; and a first circulator that circulates at least some of the alkaline aqueous solution to the crystallization device.

In the wastewater treatment apparatus of the first embodiment, examples of the first circulator include an alkaline water circulation pipe 14 which will be described later.

The wastewater treatment apparatus of the first embodiment will be described in detail with reference to FIG. 6.

Figure 6:
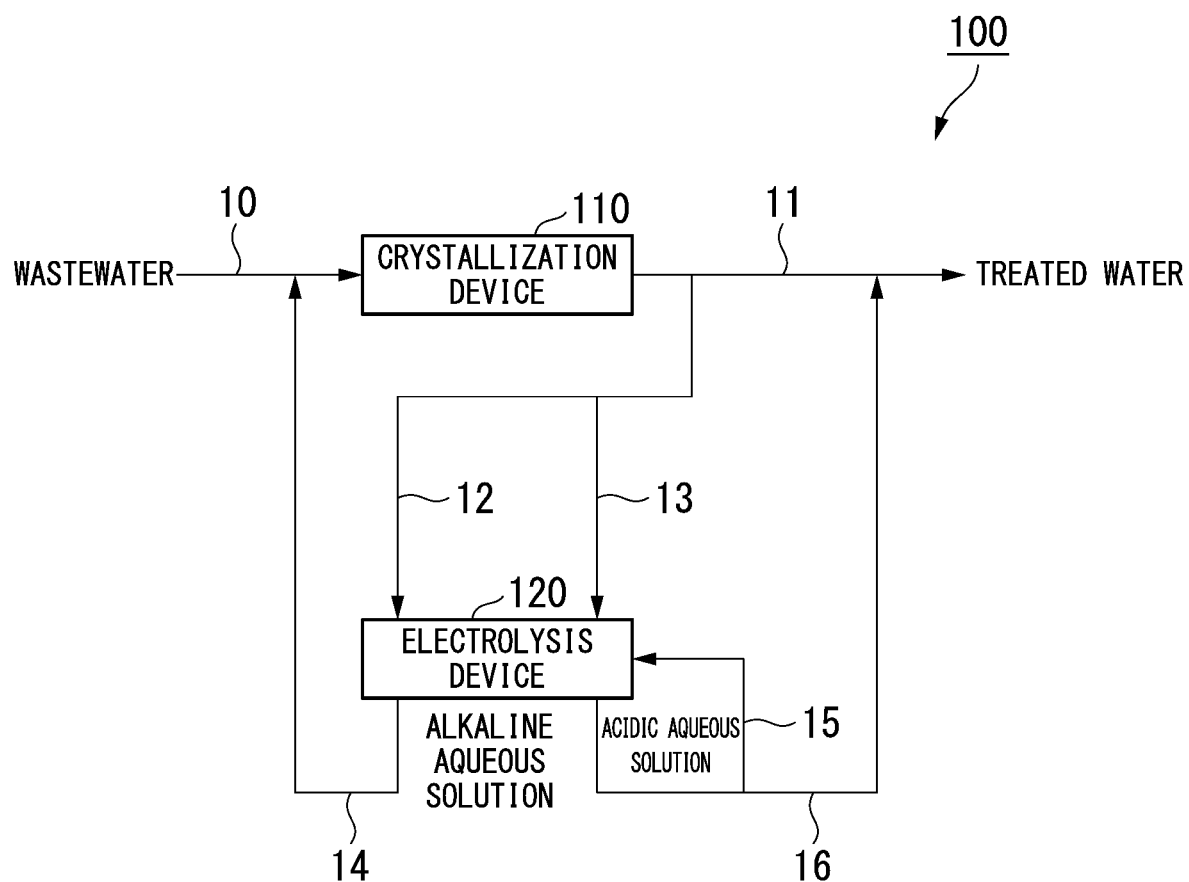
FIG. 6 is a schematic diagram of a wastewater treatment apparatus 100 of a first embodiment.

A wastewater treatment apparatus 100 of the first embodiment shown in FIG. 6 has the following configuration.

A wastewater inflow pipe 10 for supplying the wastewater is connected to a crystallization device 110. A crystallization treated water discharge pipe 11, a pipe 12 for supplying crystallization treated water to a cathode chamber, and a pipe 13 for supplying crystallization treated water to an anode chamber are connected to an outlet side of the crystallization device 110. The crystallization device 110 is connected to an electrolysis device 120 via the pipe 12 for supplying crystallization treated water to a cathode chamber and the pipe 13 for supplying crystallization treated water to an anode chamber. An alkaline water circulation pipe 14, a cleaning acidic water circulation pipe 15, and a pH adjusting acidic water circulation pipe 16 are connected to an outlet side of the electrolysis device 120. The alkaline water circulation pipe 14 is connected to the wastewater inflow pipe 10. The electrolysis device 120 is connected to the crystallization device 110 via the alkaline water circulation pipe 14 and the wastewater inflow pipe 10. The pH adjusting acidic water circulation pipe 16 is connected to the crystallization treated water discharge pipe 11.

The crystallization device 110 crystallizes and removes calcium carbonate from the wastewater containing at least chloride ions, alkali metal ions, carbonate ions, and calcium ions flowing in from the wastewater inflow pipe 10. As the crystallization device 110, a known device capable of depositing and removing calcium carbonate can be used.

The electrolysis device 120 electrolyzes some of the wastewater from which the calcium carbonate has been removed to produce an acidic aqueous solution and an alkaline aqueous solution.

Figure 7:
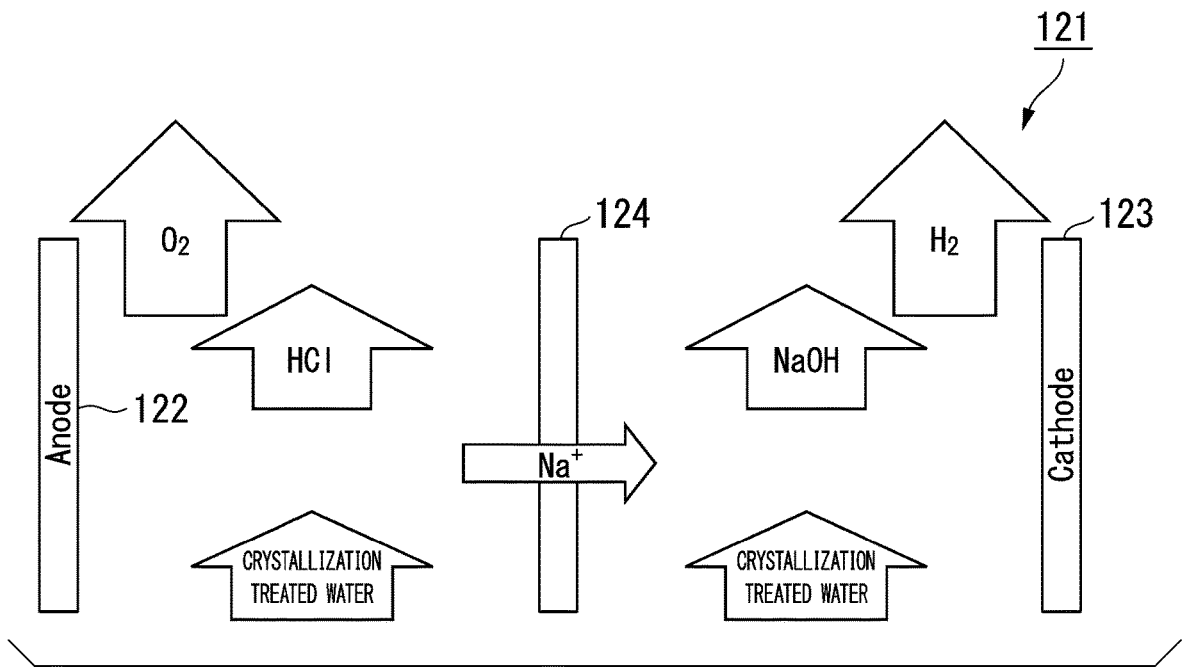
FIG. 7 is a schematic diagram of a two-chamber electrolysis device 121 which is an example of an electrolysis device.
Figure 8:
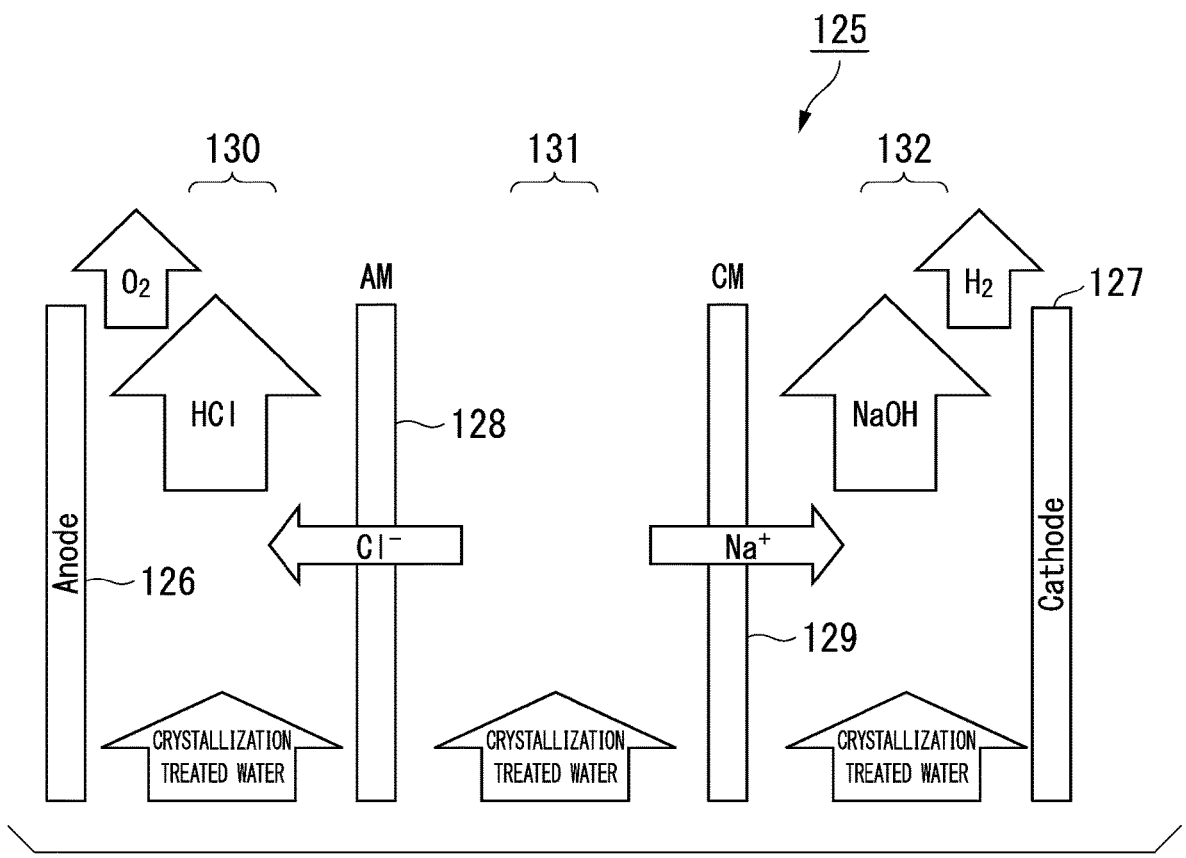
FIG. 8 is a schematic diagram of a three-chamber electrolysis device 125 which is an example of an electrolysis device.

Specific examples of the electrolysis device 120 include a two-chamber electrolysis device 121 shown in FIG. 7, a three-chamber electrolysis device 125 shown in FIG. 8, and the like.

The two-chamber electrolysis device 121 shown in FIG. 7 has an anode 122 and a cathode 123 and is divided into an anode chamber and a cathode chamber by a diaphragm 124.

Examples of the anode 122 include an electrode in which a catalyst layer is formed by firing a catalyst on a conductive metal substrate that is stable against oxidation.

Examples of the conductive metal include titanium.

Examples of the catalyst include precious metals such as platinum, iridium, ruthenium, and rhodium; valve metals such as titanium and tantalum; oxides of the valve metals; and the like.

In the anode 122, a thickness of the conductive metal substrate is preferably 0.05 to 5 mm.

A thickness of the catalyst layer is preferably 0.1 to 100 μm.

The porosity of the anode 122 is preferably 10% to 95%.

In order to enhance the adhesion of the catalyst, the conductive metal is preferably subjected to roughening treatment. Examples of the roughening treatment include blasting treatment by spraying powder, etching using soluble acid, plasma spraying, and the like.

When the anode 122 is manufactured, it is preferable to form an AIP underlayer formed of a valve metal based alloy containing crystalline tantalum and titanium components on the conductive metal substrate by an AIP (that is, arc ion plating) method before forming the catalyst layer. In a case where the AIP underlayer is provided on the conductive metal substrate, interfacial corrosion of the metal substrate can be further prevented. Further, instead of the AIP underlayer, an underlayer formed of a TiTaOx oxide layer may be formed.

Specifically, as the anode 122, a Ti mesh electrode in which a catalyst formed of Pt and Ir oxide, a hydrogen gas diffusion electrode, or the like can be used.

Among them, it is preferable to use the hydrogen gas diffusion electrode from the viewpoint that the generation of chlorine can be further suppressed.

The hydrogen gas diffusion electrode is a gas electrode formed of catalyst particles that easily oxidize hydrogen and carbon particles that serve as a carrier for the catalyst particles.

Specific examples of the catalyst particles include platinum and ruthenium.

Specific embodiments of the hydrogen gas diffusion electrode include an electrode provided with a support and a feeding portion.

Examples of the support of the hydrogen gas diffusion electrode include those in which a hydrophobic resin is fixed on a conductive carbon material (for example, a sheet, cloth, paper, or the like) having the catalyst particles.

Examples of the feeding portion include a porous plate such as a metal mesh made of a material that is durable against acidity. The support and the feeding portion are joined by crimping.

Examples of the cathode 123 include an electrode in which a catalyst layer is formed by firing a catalyst on a conductive metal substrate that is stable against oxidation, as in the anode 122.

Examples of the conductive metal include titanium, nickel, iron, stainless steel, carbon, and the like.

Examples of the catalyst include precious metals such as platinum, iridium, ruthenium, and rhodium; valve metals such as titanium and tantalum; oxides of the valve metals; and the like.

Further, as the cathode 123, a platinum-plated conductive metal may be used.

Specific examples of the diaphragm 124 include an ion exchange membrane, a resin film having porosity, and a ceramic film having porosity. It is preferable to employ a neutral film such as the resin film having porosity and the ceramic film having porosity among them. Examples of a commercially available product of the resin film having porosity include Y9201 manufactured by Yuasa Membrane System Co., Ltd. and the like.

Due to the electrolysis from the above wastewater, mixed water of hydrochloric acid and salt water is produced in the anode chamber, and mixed water of sodium hydroxide and salt water is produced in the cathode chamber.

The three-chamber electrolysis device 125 shown in FIG. 8 has an anode 126 and a cathode 127 and is divided into an anode chamber 130, an intermediate chamber 131, and a cathode chamber 132 by an anion exchange membrane 128 on a side of the anode 126 and a cation exchange membrane 129 on a side of the cathode 127.

In the three-chamber electrolysis device 125, the electrolysis is performed only in the intermediate chamber 131, and the ions generated in the intermediate chamber 131 move to the anode chamber 130 and the cathode chamber 132 on both sides.

Due to the electrolysis from the above wastewater, hydrochloric acid is produced in the anode chamber 130, and sodium hydroxide is produced in the cathode chamber 132. The three-chamber electrolysis device 125 has an advantage that salt water is not mixed with hydrochloric acid and sodium hydroxide, unlike the two-chamber electrolysis device 121.

The alkaline aqueous solution (for example, sodium hydroxide) produced by the electrolysis device 120 is supplied to the crystallization device 110 via the alkaline water circulation pipe 14 and the wastewater inflow pipe 10.

The acidic aqueous solution (for example, hydrochloric acid) produced by the electrolysis device 120 is used for cleaning the inside of the electrolysis device 120 via the cleaning acidic water circulation pipe 15 when the electrolysis device 120 is stopped. The electrolysis device 120 may include a storage tank for storing the acidic aqueous solution.

Further, the acidic aqueous solution (for example, hydrochloric acid) is supplied to the wastewater in the crystallization treated water discharge pipe 11 (that is, the wastewater from which the calcium carbonate is removed; referred to as crystallization treated water) via the pH adjusting acidic water circulation pipe 16 and is used to adjust the pH of the wastewater. Although not shown, a portion where the pH adjusting acidic water circulation pipe 16 and the crystallization treated water discharge pipe 11 are connected to each other is a mixing portion (that is, a portion where the acidic aqueous solution is mixed with the wastewater from which the calcium carbonate has been removed).

In a schematic diagram of the wastewater treatment apparatus of the first embodiment shown in FIG. 6, the wastewater treatment apparatus 100 includes the cleaning acidic water circulation pipe 15 and the pH adjusting acidic water circulation pipe 16, but the wastewater treatment device 100 may not include the cleaning acidic water circulation pipe 15 and the pH adjusting acidic water circulation pipe 16.

The wastewater treatment apparatus of the first embodiment may include optional devices other than the crystallization device and the electrolysis device described above. Examples of the optional devices include an electrodialysis device that separates some of the wastewater from which the calcium carbonate has been removed into electrodialysis concentrated water and electrodialysis diluted water by electrodialysis treatment; a reverse osmosis membrane treatment device that separates some of the wastewater from which the calcium carbonate has been removed into reverse osmosis membrane treated water and reverse osmosis membrane concentrated water using a reverse osmosis membrane; a sodium hypochlorite production device that electrolyzes some of the wastewater from which the calcium carbonate has been removed to produce a sodium hypochlorite aqueous solution; and the like.

Further, in a case where the wastewater treatment apparatus of the first embodiment includes the reverse osmosis membrane treatment device, a mixing portion that mixes the acidic aqueous solution obtained by the electrolysis device with the wastewater from which the calcium carbonate has been removed may be provided before the reverse osmosis membrane treatment device.

The reverse osmosis membrane treatment device may be provided before the crystallization device, may be provided after the crystallization device, or may be provided both before and after the crystallization treatment device.

Details of each optional device will be described later.

The wastewater treatment apparatus of the first embodiment described above includes the crystallization device, the electrolysis device, and the first circulator that circulates at least some of the alkaline aqueous solution produced by the electrolysis device to the crystallization device as described above. The alkaline aqueous solution necessary for efficiently crystallizing the calcium carbonate from the wastewater in the crystallization device can be produced on-site by the electrolysis device. The alkaline aqueous solution produced on-site by the electrolysis device can be used in the crystallization device via the first circulator. Therefore, it is <Wastewater Treatment Apparatus of Second Embodiment>

A wastewater treatment apparatus of a second embodiment is a wastewater treatment apparatus that treats wastewater containing at least chloride ions, alkali metal ions, carbonate ions, and calcium ions, the apparatus including: a crystallization device that crystallizes calcium carbonate from the wastewater to remove the calcium carbonate therefrom; an electrodialysis device that separates some of the wastewater from which the calcium carbonate has been removed into electrodialysis concentrated water and electrodialysis diluted water by electrodialysis treatment; an electrolysis device that electrolyzes some of the electrodialysis concentrated water to produce an acidic aqueous solution and an alkaline aqueous solution; a reverse osmosis membrane treatment device that separates some of the wastewater from which the calcium carbonate has been removed into reverse osmosis membrane treated water and reverse osmosis membrane concentrated water using a reverse osmosis membrane; a first circulator that circulates at least some of the alkaline aqueous solution to the crystallization device; and a second circulator that circulates at least some of the acidic aqueous solution to the electrolysis device.

In the wastewater treatment apparatus of the second embodiment, examples of the first circulator include an alkaline water circulation pipe 27 which will be described later, and examples of the second circulator include a cleaning acidic water circulation pipe 28 which will be described later.

The wastewater treatment apparatus of the second embodiment will be described in detail with reference to FIG. 9.

Figure 9:
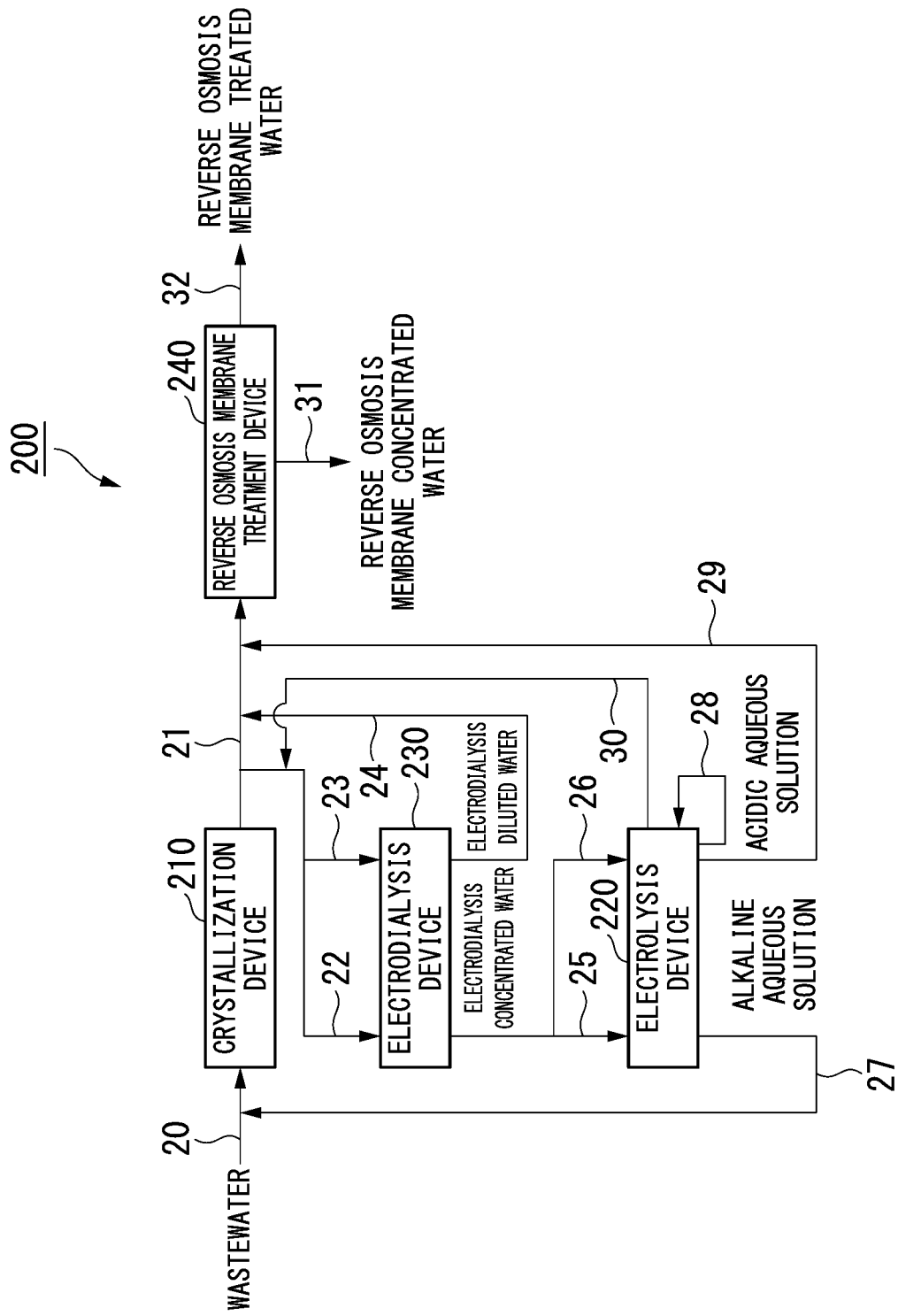
FIG. 9 is a schematic diagram of a wastewater treatment apparatus 200 of a second embodiment.

A wastewater treatment apparatus 200 of the second embodiment shown in FIG. 9 has the following configuration.

A wastewater inflow pipe 20 for supplying the wastewater is connected to a crystallization device 210. A crystallization treated water discharge pipe 21, a pipe 22 for supplying crystallization treated water to an electrodialysis concentration chamber, and a pipe 23 for supplying crystallization treated water to an electrodialysis dilution chamber are connected to an outlet side of the crystallization device 210. The crystallization device 210 is connected to an electrodialysis device 230 via the pipe 22 for supplying crystallization treated water to an electrodialysis concentration chamber and the pipe 23 for supplying crystallization treated water to an electrodialysis dilution chamber. Further, the crystallization device 210 is connected to a reverse osmosis membrane treatment device 240 via the crystallization treated water discharge pipe 21. An electrodialysis diluted water discharge pipe 24, a pipe 25 for supplying electrodialysis concentrated water to a cathode chamber, and a pipe 26 for supplying electrodialysis concentrated water to an anode chamber are connected to an outlet side of the electrodialysis device 230. The electrodialysis device 230 is connected to an electrolysis device 220 via the pipe 25 for supplying electrodialysis concentrated water to a cathode chamber and the pipe 26 for supplying electrodialysis concentrated water to an anode chamber. Further, the electrodialysis device 230 is connected to the reverse osmosis membrane treatment device 240 via the electrodialysis diluted water discharge pipe 24 and the crystallization treated water discharge pipe 21. An alkaline water circulation pipe 27, a cleaning acidic water circulation pipe 28, and a pH adjusting acidic water circulation pipe 29 are connected to an outlet side of the electrolysis device 220. The electrolysis device 220 is connected to the crystallization device 210 via the alkaline water circulation pipe 27 and the wastewater inflow pipe 20. Further, the electrolysis device 220 is connected to the reverse osmosis membrane treatment device 240 via the pH adjusting acidic water circulation pipe 29 and the crystallization treated water discharge pipe 21. The electrolysis device 220 is connected to the electrodialysis device 230 via an electrodialysis acidic water circulation pipe 30, the pipe 22 for supplying crystallization treated water to an electrodialysis concentration chamber, and the pipe 23 for supplying crystallization treated water to an electrodialysis dilution chamber. A reverse osmosis membrane concentrated water discharge pipe 31 and a reverse osmosis membrane treated water discharge pipe 32 are connected to an outlet side of the reverse osmosis membrane treatment device 240.

Examples of the crystallization device 210 and the electrolysis device 220 include the same devices as the crystallization device 110 and the electrolysis device 120 describe above.

The electrodialysis device 230 separates some of the above-mentioned wastewater from which the calcium carbonate has been removed into electrodialysis concentrated water and electrodialysis diluted water by electrodialysis treatment.

Figure 10:
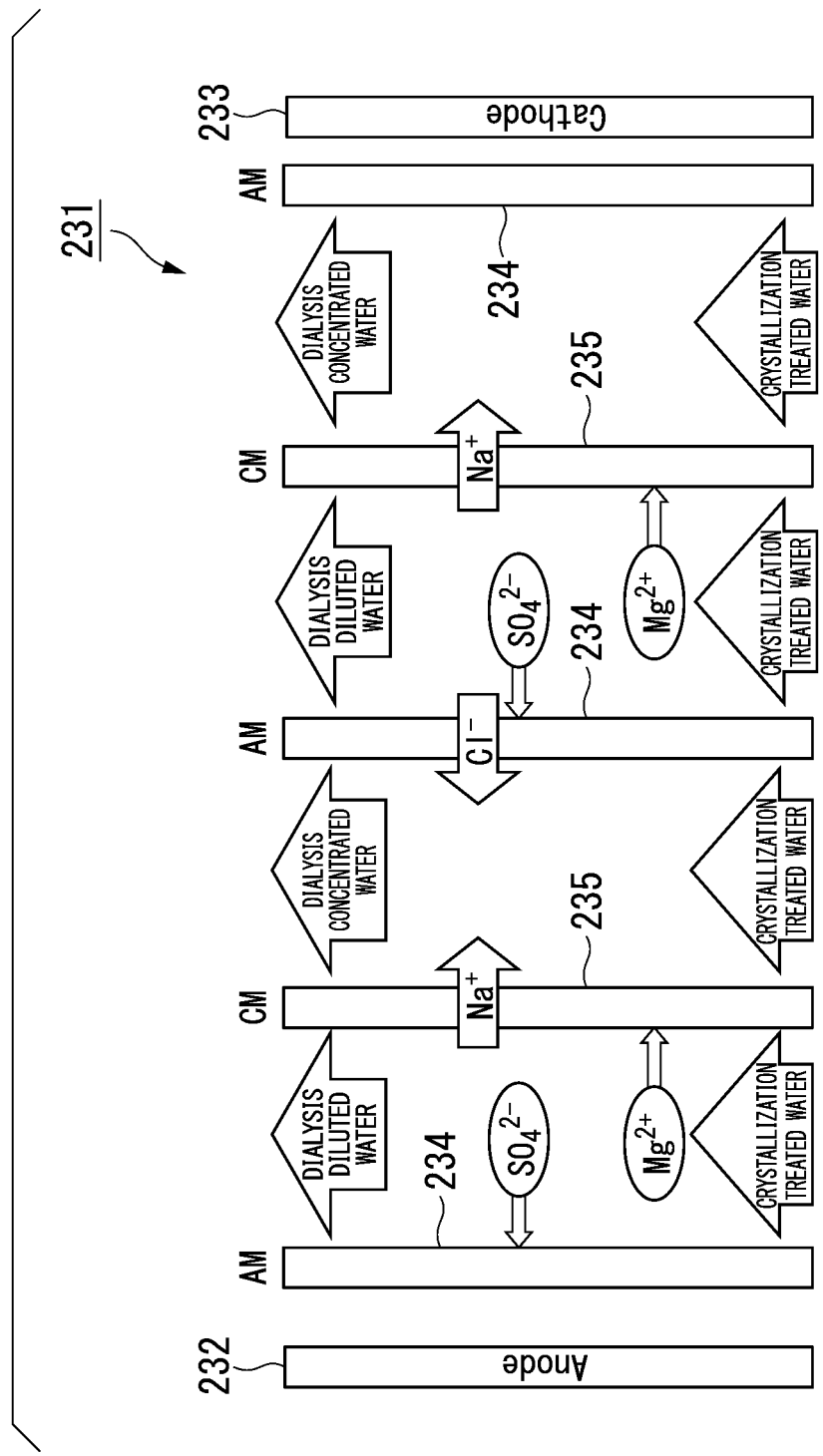
FIG. 10 is a schematic diagram of an electrodialysis device 231 which is an example of an electrodialysis device.

Specific examples of the electrodialysis device 230 include an electrodialysis device 231 having a monovalent ion selective permeable ion exchange membrane shown in FIG. 10.

The electrodialysis device 231 having a monovalent ion selective permeable ion exchange membrane includes an anode 232 and a cathode 233. Further, a monovalent anion selective permeable ion exchange membrane 234 and a monovalent cation selective permeable ion exchange membrane 235 are alternately provided between the anode 232 and the cathode 233, and thus the electrodialysis device 231 can be divided into an electrodialysis dilution chamber 236 and an electrodialysis concentration chamber 237.

Specifically, an anode which is the same as the anode 122 described above can be used as the anode 232.

Specifically, a cathode which is the same as the cathode 123 described above can be used as the cathode 233.

Specifically, ACS (manufactured by Astom Corporation) or the like can be used as the monovalent anion selective permeable ion exchange membrane 234.

Specifically, CIMS (manufactured by Astom Corporation) or the like can be used as the monovalent cation selective permeable ion exchange membrane 235.

The wastewater treatment apparatus 200 supplies the above-mentioned wastewater from which the calcium carbonate has been removed to the electrodialysis device (that is, the concentration chamber of the electrodialysis device) via the pipe 22 for supplying crystallization treated water to an electrodialysis concentration chamber, but may supply dialysis water having a small amount of multivalent ions (for example, tap water or the like) to the electrodialysis device (that is, the concentration chamber of the electrodialysis device). That is, although not shown, the wastewater treatment apparatus 200 may include a pipe for supplying dialysis water to an electrodialysis concentration chamber which is for supplying the dialysis water having a small amount of multivalent ions to the electrodialysis concentration chamber 237 in addition to the pipe 22 for supplying crystallization treated water to an electrodialysis concentration chamber.

By supplying the dialysis water having a small amount of multivalent ions to the electrodialysis device (that is, the concentration chamber of the electrodialysis device), it is possible to improve the production efficiency of the acidic aqueous solution and the alkaline aqueous solution in an electrolysis device which will be described later.

The acidic aqueous solution produced by the electrolysis device 220 is added to the wastewater to be supplied to the electrodialysis device 230 (that is, the above-mentioned wastewater from which the calcium carbonate has been removed) through the electrodialysis acidic water circulation pipe 30. As a result, it is possible to further prevent deterioration of the monovalent anion selective permeable ion exchange membrane and the monovalent cation selective permeable ion exchange membrane of the electrodialysis device 230.

Further, the acidic aqueous solution (for example, hydrochloric acid) is supplied to the wastewater in the crystallization treated water discharge pipe 21 (that is, the wastewater from which the calcium carbonate is removed; referred to as crystallization treated water) via the pH adjusting acidic water circulation pipe 29 and is used to adjust the pH of the wastewater. Although not shown, a portion where the pH adjusting acidic water circulation pipe 29 and the crystallization treated water discharge pipe 21 are connected to each other is a mixing portion (that is, a portion where the acidic aqueous solution is mixed with the wastewater from which the calcium carbonate has been removed).

The wastewater treatment apparatus 200 includes the electrodialysis device 230, and thus it is possible to increase the concentration of the monovalent cations (that is, the alkali metal ions) in the wastewater (that is, the wastewater from which the calcium carbonate has been removed). Therefore, it is possible to more efficiently produce the alkaline aqueous solution in the electrolysis device.

In addition, multivalent ions that tend to adhere to the electrolysis device can be removed in advance.

The reverse osmosis membrane treatment device 240 separates some of the supply water from which the calcium carbonate has been removed into reverse osmosis membrane treated water and reverse osmosis membrane concentrated water using a reverse osmosis membrane. As the reverse osmosis membrane, a reverse osmosis membrane having any other operating pressure can be used depending on the water quality of the supply water.

Examples of a commercially available reverse osmosis membrane include TM720-400 manufactured by Toray Industries, Inc.

The wastewater treatment apparatus 200 includes the reverse osmosis membrane treatment device 240, and thus it is possible to remove impurities other than water such as ions and salts contained in the wastewater, and it is possible to produce the treated water in which the content of the total evaporation residue (that is, TDS) is more reduced (that is, the reverse osmosis membrane treated water).

The wastewater treatment apparatus of the second embodiment described above includes the crystallization device, the electrodialysis device, the electrolysis device, the reverse osmosis membrane treatment device, the first circulator that circulates at least some of the alkaline aqueous solution produced by the electrolysis device to the crystallization device, and the second circulator that circulates at least some of the acidic aqueous solution produced by the electrolysis device to the electrolysis device as described above. Since the wastewater treatment apparatus of the second embodiment includes the electrodialysis device, it is possible to increase the concentration of the alkali metal ions in the wastewater, and it is possible to more efficiently produce the alkaline aqueous solution in the subsequent electrolysis device.

Further, the wastewater treatment apparatus of the second embodiment includes the reverse osmosis membrane treatment device, and thus it is possible to remove impurities other than water such as ions and salts contained in the wastewater, and it is possible to produce the treated water in which the content of the total evaporation residue (that is, TDS) is more reduced (that is, the reverse osmosis membrane treated water).

<Wastewater Treatment Apparatus of Third Embodiment>

A wastewater treatment apparatus of a third embodiment further includes a sodium hypochlorite production device in addition to the wastewater treatment apparatus of the second embodiment.

In the wastewater treatment apparatus of the third embodiment, examples of the first circulator include an alkaline water circulation pipe 47 which will be described later, and examples of the second circulator include a cleaning acidic water circulation pipe 48 which will be described later.

A crystallization device 310, an electrodialysis device 330, an electrolysis device 320, and a reverse osmosis membrane treatment device 340 are the same devices as those described in the above-mentioned wastewater treatment apparatuses of the first and second embodiments.

The wastewater treatment apparatus of the third embodiment will be described in detail with reference to FIG. 11.

Figure 11:
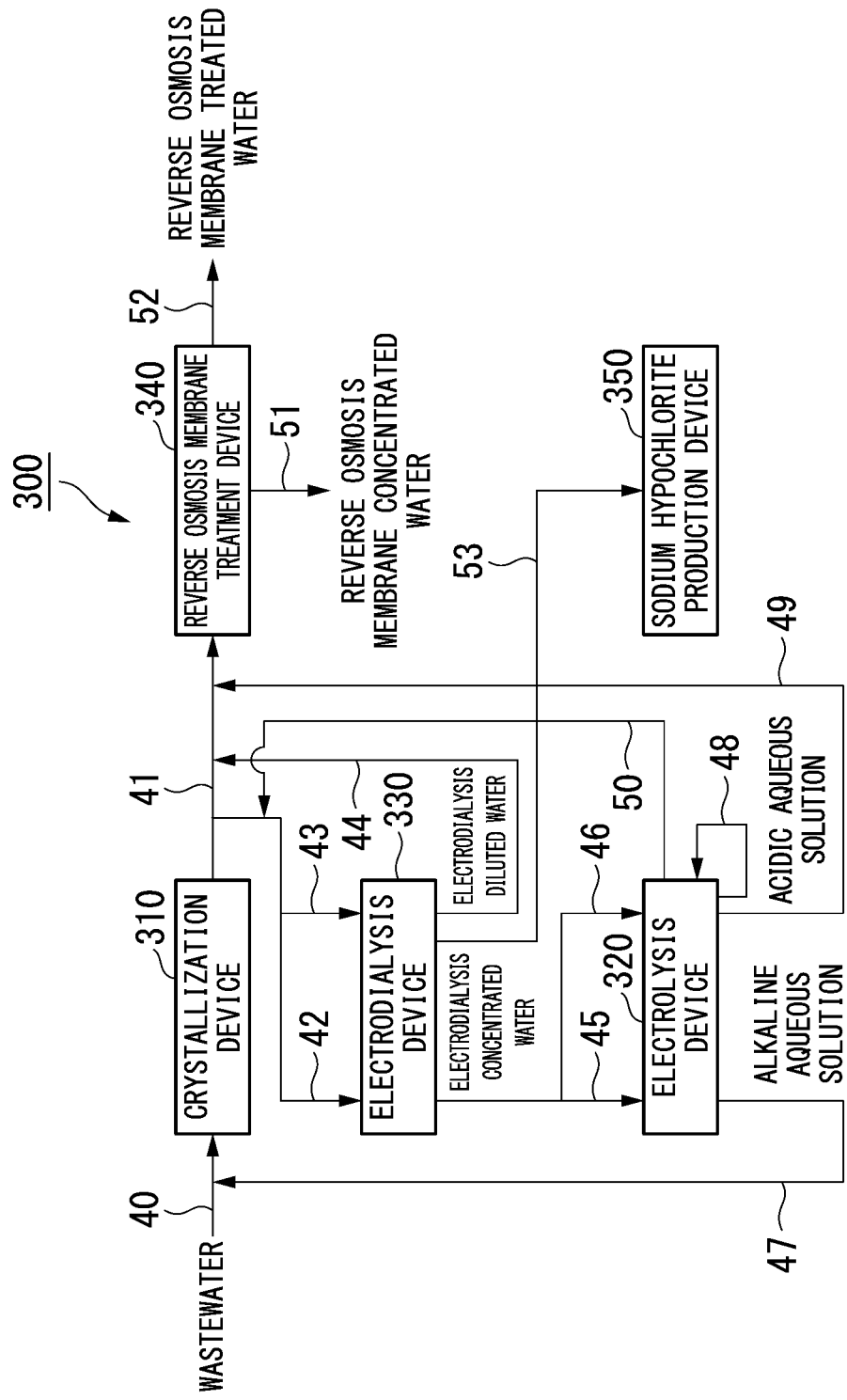
FIG. 11 is a schematic diagram of a wastewater treatment apparatus 300 of a third embodiment.

A wastewater treatment apparatus 300 of the third embodiment shown in FIG. 11 has the following configuration.

A wastewater inflow pipe 40 for supplying the wastewater is connected to the crystallization device 310. A crystallization treated water discharge pipe 41, a pipe 42 for supplying crystallization treated water to an electrodialysis concentration chamber, and a pipe 43 for supplying crystallization treated water to an electrodialysis dilution chamber are connected to an outlet side of the crystallization device 310. The crystallization device 310 is connected to the electrodialysis device 330 via the pipe 42 for supplying crystallization treated water to an electrodialysis concentration chamber and the pipe 43 for supplying crystallization treated water to an electrodialysis dilution chamber. Further, the crystallization device 310 is connected to the reverse osmosis membrane treatment device 340 via the crystallization treated water discharge pipe 41. An electrodialysis diluted water discharge pipe 44, a pipe 45 for supplying electrodialysis concentrated water to a cathode chamber, a pipe 46 for supplying electrodialysis concentrated water to an anode chamber, and an electrodialysis concentrated water supply pipe 53 are connected to an outlet side of the electrodialysis device 330. The electrodialysis device 330 is connected to the electrolysis device 320 via the pipe 45 for supplying electrodialysis concentrated water to a cathode chamber and the pipe 46 for supplying electrodialysis concentrated water to an anode chamber. Further, the electrodialysis device 330 is connected to the reverse osmosis membrane treatment device 340 via the electrodialysis diluted water discharge pipe 44 and the crystallization treated water discharge pipe 41. Further, the electrodialysis device 330 is connected to a sodium hypochlorite production device 350 via the electrodialysis concentrated water supply pipe 53. An alkaline water circulation pipe 47, a cleaning acidic water circulation pipe 48, a pH adjusting acidic water circulation pipe 49, and an electrodialysis acidic water circulation pipe 50 are connected to an outlet side of the electrolysis device 320. The electrolysis device 320 is connected to the crystallization device 310 via the alkaline water circulation pipe 47 and the wastewater inflow pipe 40. Further, the electrolysis device 320 is connected to the reverse osmosis membrane treatment device 340 via the pH adjusting acidic water circulation pipe 49 and the crystallization treated water discharge pipe 41. The electrolysis device 320 is connected to the electrodialysis device 330 via the electrodialysis acidic water circulation pipe 50, the pipe 42 for supplying crystallization treated water to an electrodialysis concentration chamber, and the pipe 43 for supplying crystallization treated water to an electrodialysis dilution chamber. A reverse osmosis membrane concentrated water discharge pipe 51 and a reverse osmosis membrane treated water discharge pipe 52 are connected to an outlet side of the reverse osmosis membrane treatment device 340.

The sodium hypochlorite production device 350 electrolyzes some of the above-mentioned wastewater from which the calcium carbonate has been removed to produce a sodium hypochlorite aqueous solution.

Figure 12:
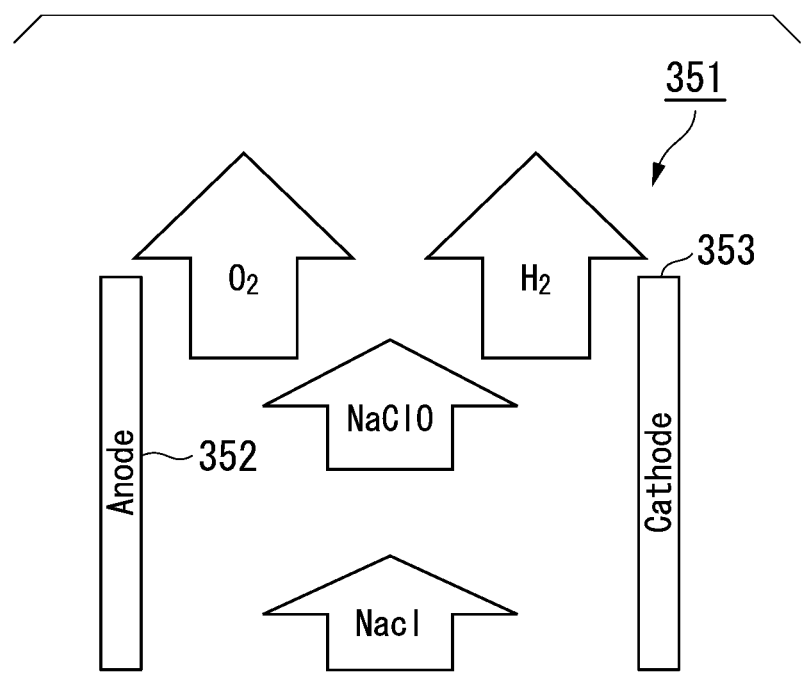
FIG. 12 is a schematic diagram of a sodium hypochlorite production device 351 which is an example of a sodium hypochlorite production device.

Specific examples of the sodium hypochlorite production device 350 include a one-chamber electrolysis device 351 shown in FIG. 12. The one-chamber electrolysis device 351 includes an anode 352 and a cathode 353.

Sodium hypochlorite is produced by electrolyzing the wastewater.

Therefore, in addition to the effects of the wastewater treatment apparatuses of the first and second embodiments described above, in the wastewater treatment apparatus of the third embodiment, the sodium hypochlorite aqueous solution to be used as a disinfectant for the treated water (that is, the reverse osmosis membrane treated water) is produced on-site in the sodium hypochlorite production device and is added to the treated water (that is, the reverse osmosis membrane treated water), and thus the sodium hypochlorite aqueous solution can be used as a disinfectant.

<Wastewater Treatment Apparatus of Fourth Embodiment>

A wastewater treatment apparatus of a fourth embodiment further includes a reverse osmosis membrane treatment device in addition to the wastewater treatment apparatus of the second embodiment described above.

That, the wastewater treatment apparatus of the fourth embodiment is a wastewater treatment apparatus that treats wastewater containing at least chloride ions, alkali metal ions, carbonate ions, and calcium ions, the apparatus including: a first reverse osmosis membrane treatment device that separates the wastewater into first reverse osmosis membrane treated water and first reverse osmosis membrane concentrated water using a first reverse osmosis membrane; a crystallization device that crystallizes calcium carbonate from the first reverse osmosis membrane treated water to remove the calcium carbonate therefrom; an electrodialysis device that separates some of the first reverse osmosis membrane concentrated water from which the calcium carbonate has been removed into electrodialysis concentrated water and electrodialysis diluted water by electrodialysis treatment; an electrolysis device that electrolyzes some of the electrodialysis concentrated water to obtain an acidic aqueous solution and an alkaline aqueous solution; a second reverse osmosis membrane unit that separates some of the first reverse osmosis membrane concentrated water from which the calcium carbonate has been removed into second reverse osmosis membrane treated water and second reverse osmosis membrane concentrated water using a second reverse osmosis membrane; a first circulator that circulates at least some of the alkaline aqueous solution to the crystallization device; and a second circulator that circulates at least some of the acidic aqueous solution to the electrolysis device.

In the wastewater treatment apparatus of the fourth embodiment, examples of the first circulator include an alkaline water circulation pipe 67 which will be described later, and examples of the second circulator include a cleaning acidic water circulation pipe 68 which will be described later.

A crystallization device 410, an electrodialysis device 430, an electrolysis device 420, and a reverse osmosis membrane treatment device 440 are the same devices as those described in the above-mentioned wastewater treatment apparatuses of the first and second embodiments.

The wastewater treatment apparatus of the fourth embodiment will be described in detail with reference to FIG. 13.

Figure 13:
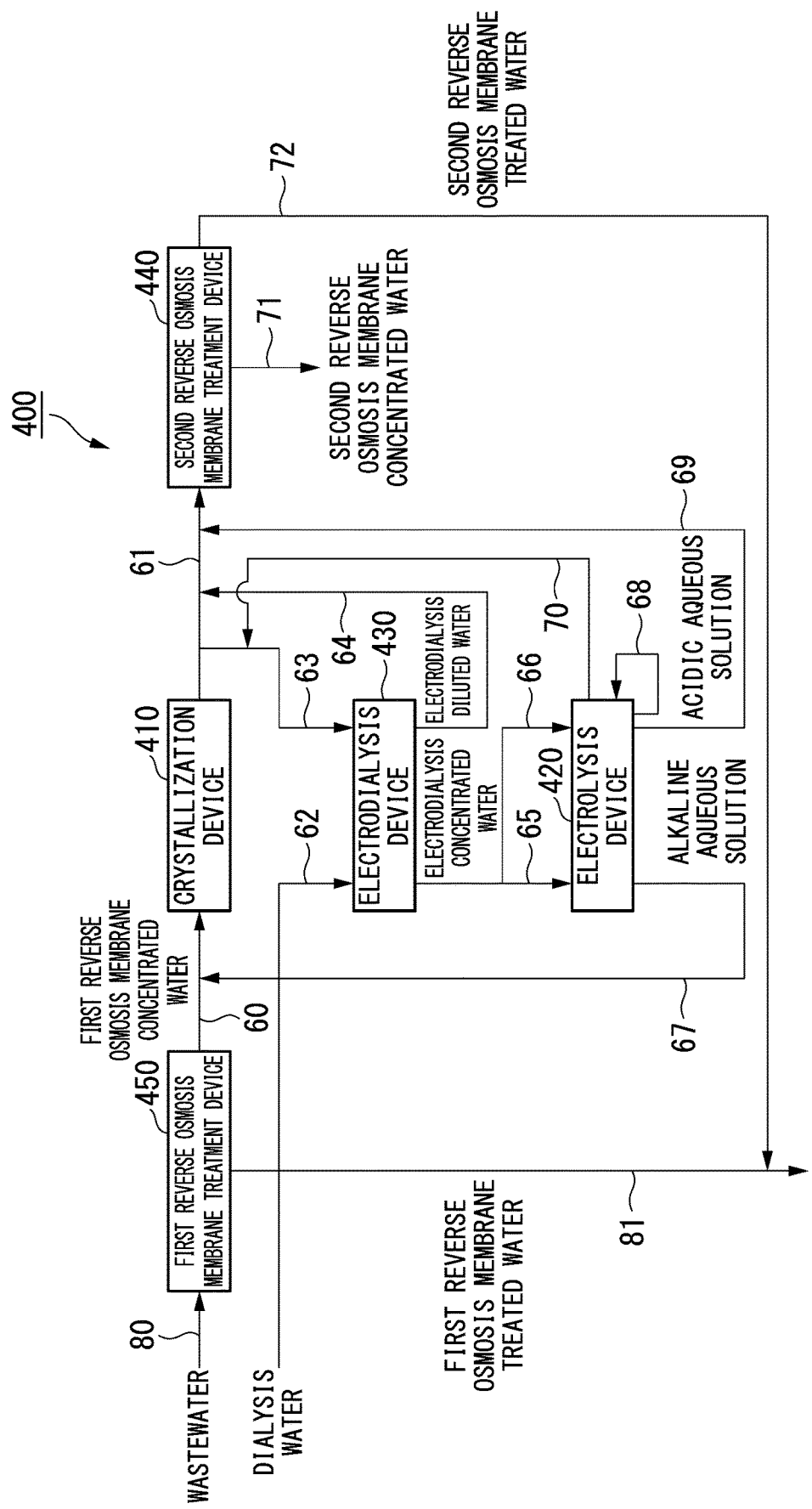
FIG. 13 is a schematic diagram of a wastewater treatment apparatus 400 of a fourth embodiment.

A wastewater treatment apparatus 400 of the fourth embodiment shown in FIG. 13 has the following configuration.

A wastewater inflow pipe 80 for supplying the wastewater is connected to a first reverse osmosis membrane treatment device 450. A first reverse osmosis membrane treated water discharge pipe 81 and a first reverse osmosis membrane concentrated water supply pipe 60 are connected to an outlet side of the first reverse osmosis membrane treatment device 450. The first reverse osmosis membrane treatment device 450 is connected to the crystallization device 410 via the first reverse osmosis membrane concentrated water supply pipe 60. A crystallization treated water discharge pipe 61, a pipe 62 for supplying dialysis water to an electrodialysis concentration chamber, and a pipe 63 for supplying crystallization treated water to an electrodialysis dilution chamber are connected to an outlet side of the crystallization device 410. The crystallization device 410 is connected to the electrodialysis device 430 via the pipe 63 for supplying crystallization treated water to an electrodialysis dilution chamber. Further, the crystallization device 410 is connected to the second reverse osmosis membrane treatment device 440 via the crystallization treated water discharge pipe 61.

An electrodialysis diluted water discharge pipe 64, a pipe 65 for supplying electrodialysis concentrated water to a cathode chamber, and a pipe 66 for supplying electrodialysis concentrated water to an anode chamber are connected to an outlet side of the electrodialysis device 430. The electrodialysis device 430 is connected to the electrolysis device 420 via the pipe 65 for supplying electrodialysis concentrated water to a cathode chamber and the pipe 66 for supplying electrodialysis concentrated water to an anode chamber. Further, the electrodialysis device 430 is connected to the second reverse osmosis membrane treatment device 440 via the electrodialysis diluted water discharge pipe 64 and the crystallization treated water discharge pipe 61. An alkaline water circulation pipe 67, a cleaning acidic water circulation pipe 68, a pH adjusting acidic water circulation pipe 69, and an electrodialysis acidic water circulation pipe 70 are connected to an outlet side of the electrolysis device 420. The electrolysis device 420 is connected to the crystallization device 410 via the alkaline water circulation pipe 67 and the first reverse osmosis membrane concentrated water supply pipe 60. Further, the electrolysis device 420 is connected to the second reverse osmosis membrane treatment device 440 via the pH adjusting acidic water circulation pipe 69 and the crystallization treated water discharge pipe 61. The electrolysis device 420 is connected to the electrodialysis device 430 via the electrodialysis acidic water circulation pipe 70, the pipe 62 for supplying dialysis water to an electrodialysis concentration chamber, and the pipe 63 for supplying crystallization treated water to an electrodialysis dilution chamber. A second reverse osmosis membrane concentrated water discharge pipe 71 and a second reverse osmosis membrane treated water discharge pipe 72 are connected to an outlet side of the second reverse osmosis membrane treatment device 440. The second reverse osmosis membrane treated water discharge pipe 72 is connected to the first reverse osmosis membrane treated water discharge pipe 81.

The first reverse osmosis membrane treatment device 450 and the second reverse osmosis membrane treatment device 440 may be the same or different. However, since the TDS increases and the osmotic pressure also increases toward the latter half of the wastewater in a flow direction, it is preferable that the reverse osmosis membrane provided in the second reverse osmosis membrane treatment device 440 have a higher pressure resistance.

The pipe 62 for supplying dialysis water to an electrodialysis concentration chamber and the pipe 63 for supplying crystallization treated water to an electrodialysis dilution chamber are connected to the electrodialysis device 430. By supplying the dialysis water having a small amount of multivalent ions to the electrodialysis concentration chamber of the electrodialysis device 430, it is possible to improve the production efficiency of the acidic aqueous solution and the alkaline aqueous solution in the electrolysis device 420.

The wastewater treatment apparatus of the fourth embodiment may also include a sodium hypochlorite production device that electrolyzes some of the electrodialysis concentrated water described above to produce a sodium hypochlorite aqueous solution.

The wastewater treatment apparatus of the fourth embodiment includes the first and second reverse osmosis membrane treatment devices, and thus, in addition to the effect of the wastewater treatment apparatus of the second embodiment, it is possible to more remove impurities other than water such as ions and salts contained in the wastewater, and it is possible to produce the treated water in which the content of the total evaporation residue (that is, TDS) is further reduced (that is, the reverse osmosis membrane treated water). In addition, the recovery rate of the reverse osmosis membrane treated water can be further improved.

EXAMPLES

Hereinafter, an aspect of the present invention will be described in more detail by way of examples, but the present invention is not limited to these examples.
<Regarding Water to be Treated>
The treatment of the wastewater of each example was performed using test water (that is, simulation wastewater) containing at least various ionic components (that is, sodium ions, calcium ions, magnesium ions, and chloride ions) shown in Table 1 as water to be treated. The test water does not contain only the various ionic components shown in Table 1, but shows only analyzed ionic components.
<Treatment of Wastewater>

Example 1

[Soft Water Treatment]
The test water was put into a beaker equipped with a stirrer and was subjected to soft water treatment to crystallize calcium carbonate from the test water and remove the calcium carbonate therefrom. In the soft water treatment, an alkaline solution (that is, a sodium hydroxide aqueous solution) obtained in an electrolysis which will be described later was used to adjust the pH of the test water to 11.

The concentrations of the various ionic components of the test water from which the calcium carbonate was removed (that is, the crystallization treated water) were as shown in Table 1. Table 1 shows only the analyzed ionic components.
[Electrodialysis]
A small electrodialysis device (S3 manufactured by Astom Corporation, 10 sections of an electrodialysis concentration chamber, electrode area 55 $cm^2$) incorporating an ion exchange membrane that selectively permeates monovalent ions was used. The electrodialysis dilution chamber was filled with 8 L of crystallization treated water. The concentration chamber was filled with 0.5 L of tap water. The flow rate in each chamber was fixed at 5 mL/min, and electrodialysis treatment was performed by applying a voltage of 10 V to obtain electrodialysis concentrated water and electrodialysis diluted water. The crystallization treated water to be supplied to the electrodialysis device was adjusted in advance such that the pH of the crystallization treated water was 7 using an acidic aqueous solution (that is, hydrochloric acid) obtained in an electrolysis which will be described later.

The concentrations of the various ionic components in the electrodialysis concentrated water obtained in the electrodialysis are as shown in Table 1. Table 1 shows only the analyzed ionic components.
[Electrolysis]
The electrodialysis concentrated water obtained in the electrodialysis was supplied to the two-chamber electrolysis device having the ion exchange membrane, and electrolysis was performed at a current density of 5 $A/dm^2$ and a voltage of 18 V.

As the anode and the cathode of the two-chamber electrolysis device, a DSE (registered trademark) mesh electrode manufactured by De Nora Permelec Ltd was used. The distance between the electrodes was 2 mm.

As a result, a 900 mg/L alkaline aqueous solution (that is, a sodium hydroxide aqueous solution) and a 340 mg/L acidic aqueous solution (that is, hydrochloric acid) were obtained. The concentrations of the alkaline aqueous solution and the various ionic components of the acidic aqueous solution are as shown in Table 1.

The concentration of the hydrochloric acid was quantified using a known sodium hydroxide aqueous solution. The concentration of the sodium hydroxide aqueous solution was quantified using a known hydrochloric acid.
[Reverse Osmosis Membrane Treatment]
The crystallization treated water and the electrodialysis diluted water were mixed with each other, and the acidic aqueous solution (that is, hydrochloric acid) obtained in the above electrolysis was added thereto to adjust the pH to 8 and to produce water to be supplied to a reverse osmosis membrane. The water to be supplied to a reverse osmosis membrane was supplied to the reverse osmosis membrane treatment device provided with the reverse osmosis membrane (medium pressure TM720-400, manufactured by Toray Industries, Inc.) to obtain the reverse osmosis membrane treated water and the reverse osmosis membrane concentrated water. At this time, the supply amount of the test water is 31.2 L/h, the recovery amount of the reverse osmosis membrane treated water is 23.4 L/h, and the water recovery rate is 75%.

The concentrations of the various ionic components of the water to be supplied to a reverse osmosis membrane, the reverse osmosis membrane treated water, and the reverse osmosis membrane concentrated water are as shown in Table 1. Table 1 shows only the analyzed ionic components.

[Measurement Method of Content of Various Ionic Components]

In an analysis method of the concentrations of the various ionic components of the test water and various types of the treated water shown in Table 1 (that is, the crystallization treated water, the electrodialysis concentrated water, the acidic aqueous solution, the alkaline aqueous solution, the water to be supplied to a reverse osmosis membrane, the reverse osmosis membrane treated water, and the reverse osmosis membrane concentrated water), a concentration of cations is a value measured using an emission spectroscopic analysis device (ICP-AES; SPS5520, manufactured by Seiko Instruments Inc.) in which ICP of argon gas is used as a light source.

On the other hand, a concentration of anions is a value measured using an ion chromatograph analysis device (ICA-2000; manufactured by DKK-TOA CORPORATION).

[Measurement Method of TDS of Test Water and Various Types of Treated Water]

The TDS of each of the test water and the various types of the treated water shown in Table 1 is a value converted from electric conductivity. Specifically, the TDS is represented by electric conductivity [μS/cm]×α (conversion factor). The electrical conductivity was measured with a conductivity meter (D74, manufactured by NORMA, Ltd.). α was set to 0.001 in consideration of the water quality of the test water.

[Measurement Method of pH of Test Water and Various Types of Treated Water]

The pH of each of the test water and the various types of the treated water shown in Table 1 is a value obtained by measuring the pH of each of the various aqueous solutions at 25° C. with a pH meter (D74, manufactured by NORMA, Ltd.).

TABLE 1

| | | $Ca^{2+}$ | $Mg^{2+}$ | $Na^+$ | $Cl^-$ | TDS | pH |
|---|---|---|---|---|---|---|---|
| Test water (simulation wastewater) | [mg/L] | 117 | 66 | 160 | 390 | 1955 | 8 |
| Crystallization treated water | [mg/L] | 58 | 66 | 160 | 390 | 2000 | 10 |
| Electrodialysis concentrated water | [mg/L] | 36 | 1.5 | 590 | 1107 | 7380 | 7 |
| Acidic aqueous solution | [mg/L] | 36 | 2 | 325 | 1110 | 7380 | 2 |
| Alkaline aqueous solution | [mg/L] | 36 | 2 | 1120 | 1110 | 7380 | 12 |
| Water to be supplied to reverse osmosis membrane | [mg/L] | 43 | 50 | 76 | 140 | 950 | 8 |
| Reverse osmosis membrane treated water | [mg/L] | 1 | 1 | 2 | 4 | 28 | 8 |
| Reverse osmosis membrane concentrated water | [mg/L] | 180 | 210 | 310 | 580 | 3700 | 8 |

As shown in Table 1, the treated water obtained by the wastewater treatment method of the present Example 1 (that is, the reverse osmosis membrane treated water) has lower concentrations of the various ionic components and a reduced TDS as compared with the test water.

According to the wastewater treatment method and the wastewater treatment apparatus of the first to fourth embodiments of the present invention, various chemicals used in the wastewater treatment process can be produced and used on-site, and the economic burden can be significantly reduced. In addition, it can be confirmed that wastewater can be treated with high removability of impurities of various ionic components only by the chemicals produced on-site without adding various chemicals from the outside.

REFERENCE SIGNS LIST

1 Soft water treatment
2 Electrolysis
3 Electrodialysis
4 Reverse osmosis membrane treatment (also referred to as second reverse osmosis membrane treatment)
5 Sodium hypochlorite production
6 First reverse osmosis membrane treatment
100, 200, 300, 400 Wastewater treatment apparatus
110, 210, 310, 410 Crystallization device
120, 220, 320, 420 electrolysis device
121 Two-chamber electrolysis device
125 Three-chamber electrolysis device
230, 330, 430 electrodialysis device
231 Electrodialysis device with monovalent ion selective permeable ion exchange membrane
240, 340, 440, 450 Reverse osmosis membrane treatment device
350 Sodium hypochlorite production device
351 One-chamber electrolysis device
14, 27, 47, 67 Alkaline water circulation pipe
15, 28, 48, 68 Cleaning acidic water circulation pipe
16, 29, 49, 69 pH adjusting acidic water circulation pipe

The invention claimed is:

1. A wastewater treatment method for treating wastewater containing at least chloride ions, alkali metal ions, carbonate ions, and calcium ions, the wastewater treatment method comprising:
  a soft water treatment of crystallizing calcium carbonate from wastewater to remove the calcium carbonate therefrom;
  an electrodialysis of separating some of the wastewater from which the calcium carbonate has been removed into electrodialysis concentrated water and electrodialysis diluted water by electrodialysis treatment;
  an electrolysis of electrolyzing some or all of the electrodialysis concentrated water to obtain an acidic aqueous solution and an alkaline aqueous solution; and
  a reverse osmosis membrane treatment of separating some of the wastewater from which the calcium carbonate has been removed into reverse osmosis membrane treated water and reverse osmosis membrane concentrated water using a reverse osmosis membrane,
  wherein a pH of the wastewater to be used in the soft water treatment is adjusted to 10 or more by circulating at least some of the alkaline aqueous solution,
  at least some of the acidic aqueous solution is circulated to be used in the electrodialysis, and
  a pH of the wastewater to be used in the reverse osmosis membrane treatment is adjusted to be in a range of 8.5 to 9.5.

2. The wastewater treatment method according to claim 1, wherein at least some of the acidic aqueous solution is circulated to be used in the electrolysis.

3. The wastewater treatment method according to claim 1, the wastewater treatment method further comprising a sodium hypochlorite production of electrolyzing some or all of the electrodialysis concentrated water to produce a sodium hypochlorite aqueous solution.

4. The wastewater treatment method according to claim 1, wherein the electrolysis is performed by a hydrogen oxidation reaction.

5. The wastewater treatment method according to claim 1, wherein the wastewater, whose pH is 10 or more, to be used in the electrodialysis is neutralized when at least some of the acidic aqueous solution is circulated to be used in the electrodialysis.

6. A wastewater treatment apparatus that treats wastewater containing at least chloride ions, alkali metal ions, carbonate ions, and calcium ions, the wastewater treatment apparatus comprising:

a crystallization device that crystallizes calcium carbonate from the wastewater to remove the calcium carbonate therefrom;

an electrodialysis device that separates some of the wastewater from which the calcium carbonate has been removed into electrodialysis concentrated water and electrodialysis diluted water by electrodialysis treatment;

an electrolysis device that electrolyzes some or all of the electrodialysis concentrated water to produce an acidic aqueous solution and an alkaline aqueous solution;

a reverse osmosis membrane treatment device that separates some of the wastewater from which the calcium carbonate has been removed into reverse osmosis membrane treated water and reverse osmosis membrane concentrated water using a reverse osmosis membrane;

a first circulator that circulates at least some of the alkaline aqueous solution to the crystallization device;

an electrodialysis acidic water circulation pipe that circulates at least some of the acidic aqueous solution to circulate in the electrodialysis device; and a pH adjusting acidic water circulation pipe that circulates at least some of the acidic aqueous solution to circulate in the reverse osmosis membrane treatment device.

7. The wastewater treatment apparatus according to claim 6, the wastewater treatment apparatus further comprising a second circulator that circulates at least some of the acidic aqueous solution to the electrolysis device.

8. The wastewater treatment apparatus according to claim 6, the wastewater treatment apparatus further comprising a sodium hypochlorite production device that electrolyzes some or all of the electrodialysis concentrated water to produce a sodium hypochlorite aqueous solution.

9. The wastewater treatment apparatus according to claim 6, wherein the electrolysis device has an anode which is a hydrogen gas diffusion electrode.

* * * * *